United States Patent
Tomky et al.

(10) Patent No.: US 10,228,732 B2
(45) Date of Patent: Mar. 12, 2019

(54) HINGE WITH VARIABLE SLIDING FRICTION

(71) Applicant: Microsoft Technology Licensing, LLC, Redmond, WA (US)

(72) Inventors: Brett Andrew Tomky, Seattle, WA (US); Liang Zhang, Hangzhou (CN); Bonggwon Ji, Hangzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/599,632

(22) Filed: May 19, 2017

(65) Prior Publication Data

US 2018/0335808 A1    Nov. 22, 2018

(51) Int. Cl.
    *E05F 1/08*        (2006.01)
    *G06F 1/16*        (2006.01)
    *E05D 11/08*       (2006.01)

(52) U.S. Cl.
    CPC .......... *G06F 1/1681* (2013.01); *E05D 11/087* (2013.01); *G06F 1/1616* (2013.01); *E05Y 2900/606* (2013.01); *G06F 1/16* (2013.01)

(58) Field of Classification Search
    CPC ... Y10T 16/542; Y10T 16/543; Y10T 16/544; Y10T 16/5443; Y10T 16/5445;
    (Continued)

(56) References Cited

U.S. PATENT DOCUMENTS 3,555,591 A *  1/1971  Sogoian ................... E05F 3/16
                                                   16/49
4,190,274 A *  2/1980  Gross ..................... E05C 17/30
                                                   16/49
(Continued)

FOREIGN PATENT DOCUMENTS

CN    205260602 U    5/2016
JP    2015048906 A   3/2015
JP    2015206424 A   11/2015

OTHER PUBLICATIONS

"Acer Aspire S7", http://cdn.technomarket.bg/uploads/library/product/09125871/566eb57bf2486.pdf, Retrieved on: Jan. 17, 2017, 13 pages.
"Can Microsoft's new Surface tablet replace your laptop?", Retrieved from: http://techtalk.currys.co.uklcomputing/laptops-desktops-tablets/can-microsoft-s-new-surface-tablet-replace-your-laptop/, May 21, 2014, 5 Pages.
(Continued)

*Primary Examiner* — Chuck Y Mah
(74) *Attorney, Agent, or Firm* — Arent Fox LLP

(57) ABSTRACT

A friction hinge is described. Generally, the friction hinge provides a variable torque profile for a movable component. In an example, the friction hinge includes a hinge frame; a pivot member pivotably engaged with the hinge frame, the pivot member being attached to a support component movably attached to a device; an elongated member attached to the to hinge frame, the elongated member having a ramped surface on at least a first portion of the elongated member; and an engagement member slidably engaged with the elongated member, the engagement member configured to slide along the elongated member during pivoting of the pivot member relative to the hinge frame, the sliding of the engagement member along the taped surface of the elongated member causing variations in a sliding friction based on an amount of change in surface height over longitudinal distance of the ramped surface and contributing to a torque profile of the hinge.

17 Claims, 29 Drawing Sheets

(58) Field of Classification Search
CPC ............... Y10T 16/5448; Y10T 16/545; Y10T 16/54038; G06F 1/16; G06F 1/1616; G06F 1/1681; G06F 1/166; G06F 1/1679; E05D 3/18; E05D 3/122; E05D 3/12; E05D 3/16; E05D 3/06; E05D 15/32; E05D 15/28; E05D 15/30; E05D 15/40; E05D 1/04; E05D 2001/045; E05D 11/1021; E05D 11/1078; E05D 11/082; E05D 11/087; H04M 1/022; H04M 1/0214; H04M 1/0216; H04M 1/0222; H05K 5/0226; F16M 11/10; E05Y 2900/606

See application file for complete search history.

(56) References Cited

U.S. PATENT DOCUMENTS

| | | | | |
|---|---|---|---|---|
| 5,168,426 | A * | 12/1992 | Hoving | G06F 1/1616 16/361 |
| 5,195,213 | A | 3/1993 | Ohgami et al. | |
| 5,494,447 | A * | 2/1996 | Zaidan | G06F 1/1618 16/361 |
| 6,038,739 | A | 3/2000 | Katoh | |
| 6,070,298 | A | 6/2000 | Sorimachi | |
| 6,119,310 | A | 9/2000 | Ohshima et al. | |
| 7,530,142 | B2 * | 5/2009 | Sutterlutti | E05D 3/022 16/239 |
| 8,713,757 | B2 * | 5/2014 | Chen | G06F 1/1616 16/327 |
| 9,411,365 | B1 | 8/2016 | Tanner et al. | |
| 9,483,084 | B2 | 11/2016 | Johnson et al. | |
| 9,540,855 | B2 | 1/2017 | Kato | |
| 9,549,479 | B2 | 1/2017 | Gault et al. | |
| 2005/0225934 | A1 * | 10/2005 | Homer | G06F 1/1616 361/679.21 |
| 2006/0272128 | A1 | 12/2006 | Rude | |
| 2007/0186382 | A1 | 8/2007 | Huang | |
| 2010/0120577 | A1 | 5/2010 | Gu et al. | |
| 2010/0307872 | A1 * | 12/2010 | Wheeler | E05C 17/30 188/67 |
| 2011/0023272 | A1 * | 2/2011 | Huang | E05D 3/18 16/362 |
| 2013/0068902 | A1 * | 3/2013 | Huang | F16M 11/10 248/188.8 |
| 2013/0125343 | A1 * | 5/2013 | Zimmer | E05C 17/30 16/341 |
| 2013/0221825 | A1 * | 8/2013 | Bonomie | E05F 3/20 312/405 |
| 2013/0229773 | A1 | 9/2013 | Siddiqui et al. | |
| 2014/0138507 | A1 | 5/2014 | Hennessey et al. | |
| 2014/0317882 | A1 * | 10/2014 | Chen | G06F 1/1681 16/225 |
| 2014/0363245 | A1 | 12/2014 | Clark | |
| 2015/0022961 | A1 | 1/2015 | Jenkins et al. | |
| 2015/0121654 | A1 | 5/2015 | Novin | |
| 2015/0184438 | A1 | 7/2015 | Varadarajan et al. | |
| 2015/0286255 | A1 | 10/2015 | Hamel et al. | |
| 2015/0309539 | A1 | 10/2015 | Kamphuis et al. | |
| 2015/0346780 | A1 | 12/2015 | Leon et al. | |
| 2016/0083989 | A1 * | 3/2016 | Kuo | E05D 1/04 16/355 |
| 2016/0153222 | A1 | 6/2016 | Hu | |
| 2016/0320811 | A1 * | 11/2016 | Lin | G06F 1/1681 |
| 2016/0369543 | A1 * | 12/2016 | Park | E05D 11/082 |
| 2017/0003719 | A1 * | 1/2017 | Siddiqui | E05D 1/04 |
| 2017/0139446 | A1 * | 5/2017 | Lan | G06F 1/1681 |
| 2017/0292302 | A1 * | 10/2017 | Tomky | E05D 11/082 |

OTHER PUBLICATIONS

"International Search Report and Written Opinion Issued in PCT Application No. PCT/US18/034523", dated Aug. 10, 2018, 10 Pages.

"International Search Report and Written Opinion Issued in PCT Application No. PCT/US2018/028774", dated Jun. 25, 2018, 14 Pages.

* cited by examiner

HINGE WITH VARIABLE SLIDING FRICTION

BACKGROUND

The present disclosure relates to a hinge and a device using the hinge, and more particularly, to a hinge with variable sliding friction.

A hinge may be used in a variety of applications. For instance, but not limited hereto, a hinge assembly may be used in a kickstand to support a mobile computing device. Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, the devices are typically designed to be used in a handheld manner. Traditional ways of adapting mobile devices for other uses (e.g., on a table or other surface) tend to be awkward and detract from the mobile aesthetic associated with mobile devices.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its purpose is to present some concepts of one or more implementations in a simplified form as a prelude to the more detailed description that is presented later.

A hinge assembly having a variable sliding friction feature is described. Generally, the hinge assembly provides a variable torque profile based on the variable sliding friction feature.

In one example, a device may comprise a support component movably attached to the device, the support component configured to physically support the component in one or more positions relative to an adjacent surface, and at least one hinge that moveably attaches a portion of the support component to the device. Each hinge includes a hinge frame, a pivot member pivotably engaged with the hinge frame, the pivot member being attached to the support component, an elongated member attached to the hinge frame, the elongated member having a ramped surface on at least a first portion of the elongated member, and an engagement member slidably engaged with the elongated member. The described aspects further include that the engagement member is configured to slide along the elongated member during pivoting of the pivot member relative to the hinge frame, the sliding of the engagement member along the ramped surface of the elongated member causing variations in a sliding friction based on an amount of change in surface height over longitudinal distance of the ramped surface and contributing to a torque profile of the hinge.

In another example, a hinge comprises a hinge frame, a pivot member pivotably engaged with the hinge frame, the pivot member being attached to a support component movably attached to a device, an elongated member attached to the to hinge frame, the elongated member having a ramped surface on at least a first portion of the elongated member, and an engagement member slidably engaged with the elongated member. The described aspects further include that the engagement member is configured to slide along the elongated member during pivoting of the pivot member relative to the hinge frame, the sliding of the engagement member along the taped surface of the elongated member causing variations in a sliding friction based on an amount of change in surface height over longitudinal distance of the ramped surface and contributing to a torque profile of the hinge.

In another example, an apparatus comprises a chassis, a support component movably attached to the chassis, the support component being configured to physically support the component in one or more positions relative to an adjacent surface, and at least one hinge that moveably attaches a portion of the support component to the chassis. Each hinge includes a hinge frame, a pivot member pivotably engaged with the hinge frame, the pivot member being attached to the support component, an elongated member attached to the hinge frame, the elongated member having a ramped surface on at least a first portion of the elongated member, and an engagement member slidably engaged with the elongated member. The described aspects further include that the engagement member is configured to slide along the elongated member during pivoting of the pivot member relative to the hinge frame, the sliding of the engagement member along the ramped surface of the elongated member causing variations in a sliding friction based on an amount of change in surface height over longitudinal distance of the ramped surface and contributing to a torque profile of the hinge.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The specific features, implementations, and advantages of the disclosure will become better understood with regard to the following description, appended claims, and accompanying drawings where:

FIGS. 12-1, 12-2, 12-3, 12-4, and 12-5 depict, a left side rear, a right side rear, top, bottom perspective views and an exploded view, respectively, of one example of a representative hinge;

FIGS. 13-1 and 13-2 depict a left side front perspective view and an exploded view, respectively, of another example of a representative hinge;

DETAILED DESCRIPTION

Figure 1:
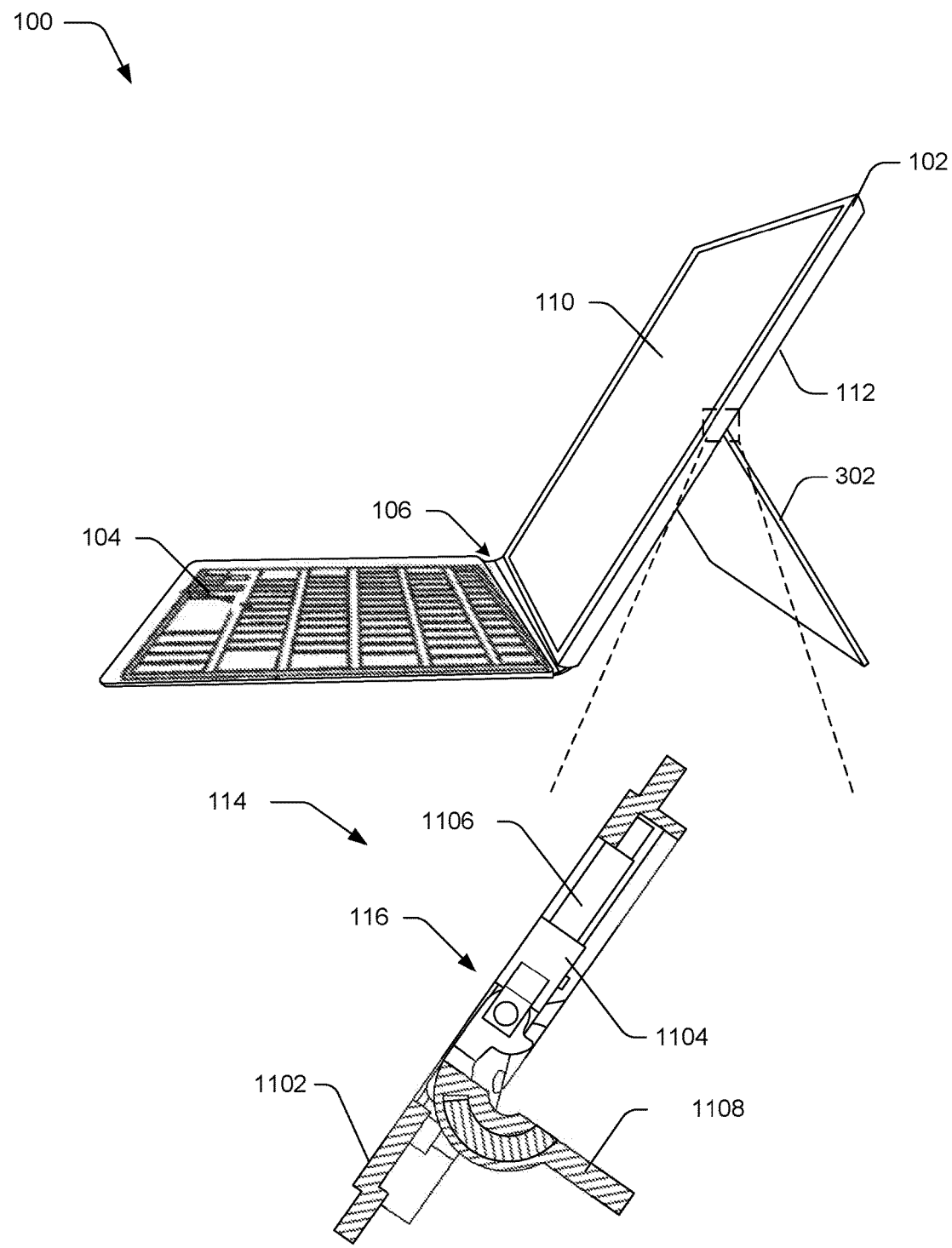
FIG. 1 is a right side front perspective view of an environment, e.g., a computing device, including a reference to a location in the environment and an enlarged right side (with front facing left) cutaway view of an example hinge in one of a plurality of open positions in an example implementation that is operable to employ the techniques described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In some implementations, examples may be depicted with reference to one or more components and one or more methods that may perform the actions or operations described herein, where components and/or actions/operations in dashed line may be optional.

The present disclosure relates to a hinge providing a variable torque profile for a movable component. In at least some implementations, the described hinge may be referred to as a friction hinge, and such a hinge enables a support component to be adjustably attached to an apparatus, such as a computing device. For example, the hinge mechanism can be employed to rotatably attach a kickstand to a mobile computing device. The kickstand can be rotated via the hinge mechanism to various positions to provide support for different orientations of the computing device. This example is not intended to be limiting, however, and the described implementations can be used for hingeable attachment of a wide variety of different components to a wide variety of different apparatus.

According to various implementations, the disclosed hinge includes different action zones where movement of the hinge is based on different torque responses. Thus, torque response of the hinge mechanism can vary over different opening and closing angles.

Moreover, as will be explained in detail below, the arrangement of the hinge described herein enables the hinge to be designed with a compact size, e.g., with a minimal height, by transforming the rotational motion of a pivot member (e.g., to which a kickstand is attached) into linear motion. Further, the linear motion is transferred to an engagement member resiliently biased against an at least partially ramped or sloped surface of an elongated member. For example, the elongated member extends in a longitudinal direction, and at least a portion of a surface of the elongated member is ramped or sloped over at least a portion of the longitudinal direction. For example, but not limited hereto, the body of the elongated member may change in thickness or diameter, or a channel within the body of the elongated member may change in width, in the ramped or sloped portion of the surface of the elongated member. Due to the resilient biasing of the engagement member, the force (and, hence, sliding friction) between the engagement member and the elongated member may change along the ramped or sloped portion of the surface of the elongated member as the engagement member moves in the longitudinal direction. Thus, the movement of the engagement member linearly along the elongated member provides a variable amount of sliding friction that can be configured to meet a torque profile or set of particular torque responses.

In the following discussion, an example environment is first described that may employ the techniques described herein. Implementations discussed herein are not limited to the example environment, and the example environment is not limited to implementations discussed herein. Next, example device orientations are discussed in accordance with one or more implementations. Following this, example hinges for support component attachment are discussed in accordance with one or more implementations. Finally, an example system and device are discussed that may implement various techniques described herein.

FIG. 1 is a right side front perspective view of an environment 100, e.g., a computing device, including a reference to a location in the environment 100 and an enlarged right side (with front facing left) cutaway view of an example hinge 114 in one of a plurality of open positions in an example implementation that is operable to employ techniques described herein. The illustrated environment 100 includes an example of a client device 102, e.g., the computing device, that is physically and communicatively coupled to an input device 104 via a flexible hinge 106. The client device 102 may be configured in a variety of ways. For example, the client device 102 may be configured for mobile use, such as a mobile phone, a tablet computer as illustrated, a wearable device, and so on.

While implementations presented herein are discussed in the context of a tablet device, it is to be appreciated that various other types and form factors of devices may be utilized in accordance with the claimed implementations. Thus, the client device 102 may range from full resource devices with substantial memory and processor resources, to a low-resource device with limited memory and/or processing resources. An example implementation of the client device 102 is discussed below with reference to FIG. 26.

The client device 102 is illustrated as including an input/output module, which is representative of functionality relating to processing of inputs and rendering outputs of the client device 102. A variety of different inputs may be processed by an input device, such as inputs relating to functions that correspond to keys of the input device 104, keys of a virtual keyboard displayed by the display device 110 to identify touch gestures and cause operations to be performed that correspond to the touch gestures, and so forth. Thus, the input device 104 may support a variety of different input techniques by recognizing and leveraging a division between types of inputs including key presses, touch gestures, touchless gestures recognized via a camera functionality of the client device 102, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the client device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that implementation is also contemplated. Further, this flexible rotation may be configured to support movement in one or more directions (e.g., vertically in the figure) yet restrict movement in other directions, such as lateral movement of the input device 104 in relation to the client device 102. This may be used to support consistent alignment of the input device 104 in relation to the client device 102, such as to align sensors used to change power states, application states, and so on.

The client device 102 further includes a display 110 and a support component 302. The display 110 is configured as a visual output functionality of the client device 102. The support component 302 is rotatably and/or pivotably attached to a rear surface 112 of the client device 102 via one or more instances of a hinge 114 having a variable sliding friction feature 116 that contributes to a torque profile for opening and closing of support component 302 relative to rear surface 112 of client device 102. As such, hinge 114 may be referred to as a friction hinge. In other words, hinge 114 transforms the rotation of support component 302 into linear motion that is resisted by the friction force of sliding friction feature 116. For instance, the support component 302 is pivotable to different angles relative to the rear surface 112 to support different orientations of the client device 102, and the variable sliding friction feature 116 of hinge 114 provides different levels of torque for at least some of the different orientations. For example, the different levels of torque enable hinge 114 to resist rotation based on at least the weight of client device 102, and optionally further based on addition force (e.g., applying of a touch by a user), and thereby maintain support component 302 and client device 102 in a given relative position.

An enlarged side view of the hinge 114 is presented here, with a detailed explanation of the components described below. In this example implementation, the variable sliding friction feature 116 may include, but is not limited to, an elongated member 1106 such as but not limited to a shaft having a diameter that is ramped along at least a portion of its length, and an engagement member 1104 such as but not limited to a band that applies a variable engagement force to the shaft as the band slides along the ramped portion of the shaft in correspondence with pivoting of a pivot member 1108 of the hinge 114. It should be understood that this is only one example of the variable sliding friction feature 116, and other configurations As such, the variable engagement force corresponds to variable amounts of sliding friction along at least some of the at different positions of the engagement member 1104 as it moves along the elongated member 1106 in tandem with the pivoting of the pivot member 1108, and to at least a portion of the different levels of torque of the torque profile of the hinge 114.

As described in further detail below, the hinge 114 may generally include a hinge frame 1102, the pivot member 1108 pivotably engaged with the hinge frame 1102, the pivot member 1108 being attached to the support component 302, the elongated member 1106 attached to the hinge frame 1102, the elongated member 1106 having a ramped surface on at least a first portion of the elongated member 1106, and the engagement member 1104 slidably engaged with the elongated member 1106. In an example, the engagement member 1104 is configured to slide against the elongated member 1106 during pivoting of the pivot member 1108 relative to the hinge frame 1102, and the sliding of the engagement member 1104 along the ramped surface of the elongated member 1106 causing variations in a sliding friction during at least some of the linear motion based on an amount of change in surface height over longitudinal distance of the ramped surface and contributing to a torque profile of the hinge 114.

According to various implementations, a variety of different orientations of the client device 102 are supported. For example, rotational movement of the input device 104 is supported by the flexible hinge 106 such that the input device 104 may be placed against the display device 110 of the client device 102 and thereby act as a cover as shown in the example orientation 200 of FIG. 2. Thus, the input device 104 may act to protect the display 110 of the client device 102 from harm.

Figure 3:
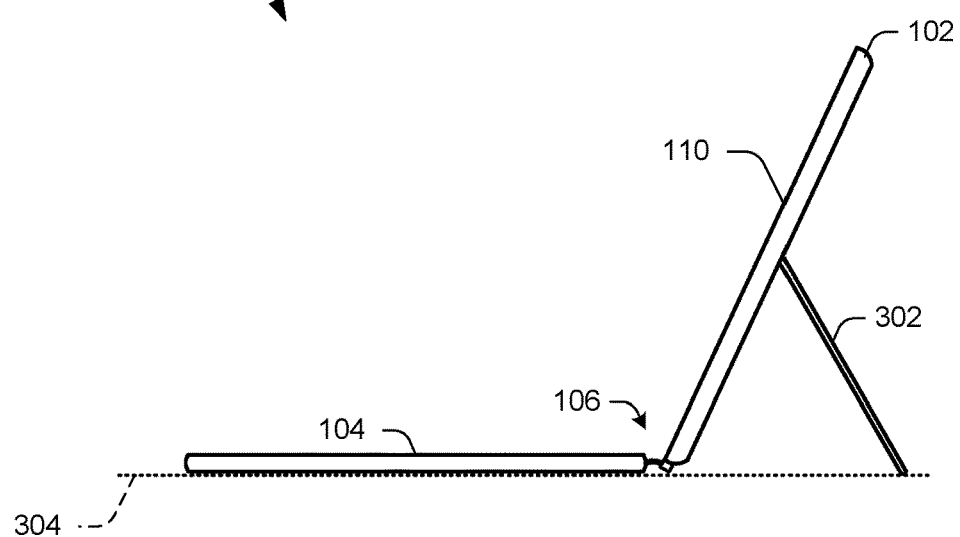
FIG. 3 is a right side view of an example orientation of a computing device in relation to an input device, for example, in an open position that may be referred to as a typing orientation.

As shown in the example orientation 300 of FIG. 3, a typing arrangement may be supported. In this orientation, the input device 104 is laid flat against an adjacent surface 304 (e.g., a desk, a table, and so forth) and the client device 102 is disposed at an angle to permit viewing of the display device 110, e.g., such as through use of a support component 302 (e.g., kickstand) disposed on a rear surface of the client device 102. According to various implementations, the support component 302 serves as a kickstand to enable a variety of different orientations for the client device 102, some of which are described herein. Naturally, a variety of other orientations other than those expressly illustrated and discussed herein are also supported. Generally, the support component 302 is held in position via a hinge, e.g., hinge 114 (FIG. 1), examples of which are detailed below.

Figure 4:
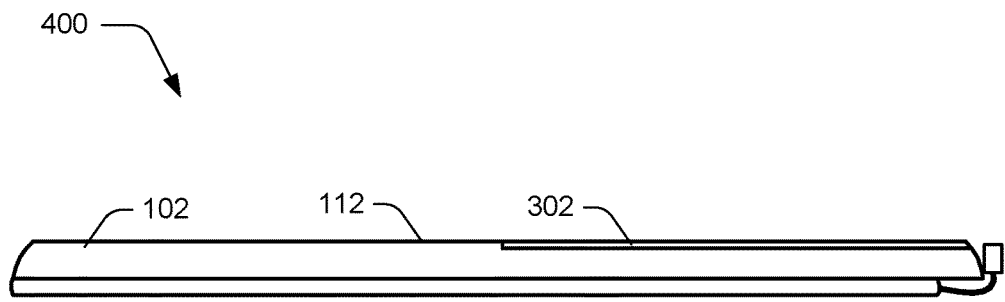
FIG. 4 is a right side view of an example orientation of a computing device facing down, similar to FIG. 2, but further including a support component.

FIG. 4 illustrates a position 400 which represents the support component 302 in a closed position. In the closed position, the support component 302 forms a portion of the rear surface 112 of the client device 102 such that the support component 302 conforms to a surface contour of the client device 102. For instance, when the support component 302 is in the closed position, the support component 302 integrates into the client device 102 and does not protrude from a plane formed by the rear surface 112.

Figure 5:
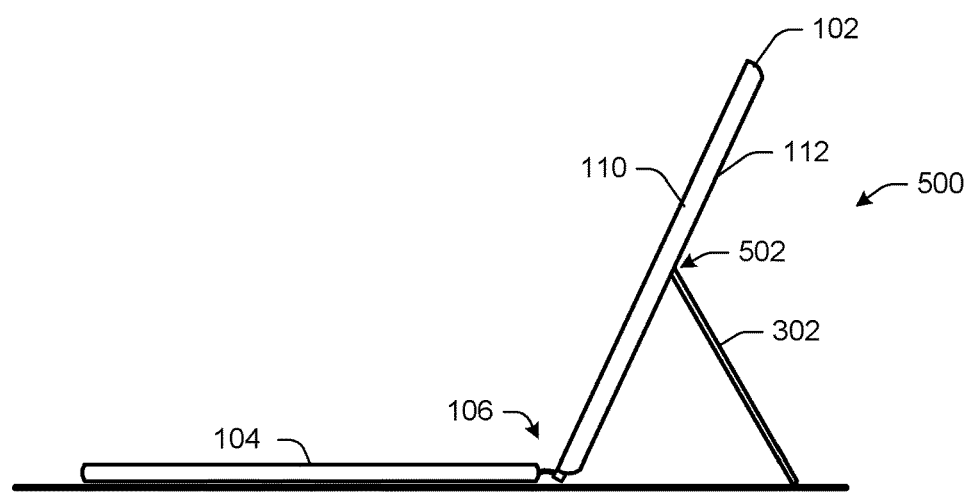
FIG. 5 is a right side view of an example orientation of a computing device with a support component, similar to FIG. 3.

FIG. 5 illustrates that the support component 302 can be rotated away from the rear surface 112 of the client device 102 to a position 500. For instance, the support component 302 can be rotatably attached to the client device 102 along a seam 502 via a hinge, e.g., hinge 114 (FIG. 1). Examples of such a hinge are detailed below.

The position 500 enables a variety of different usage scenarios, such as by allowing the display device 110 to be viewed and input to be provided to the client device 102 via the input device 104. Alternatively or additionally, the position 500 enables a user to interact with a touchscreen of the client device 102.

Figure 6:
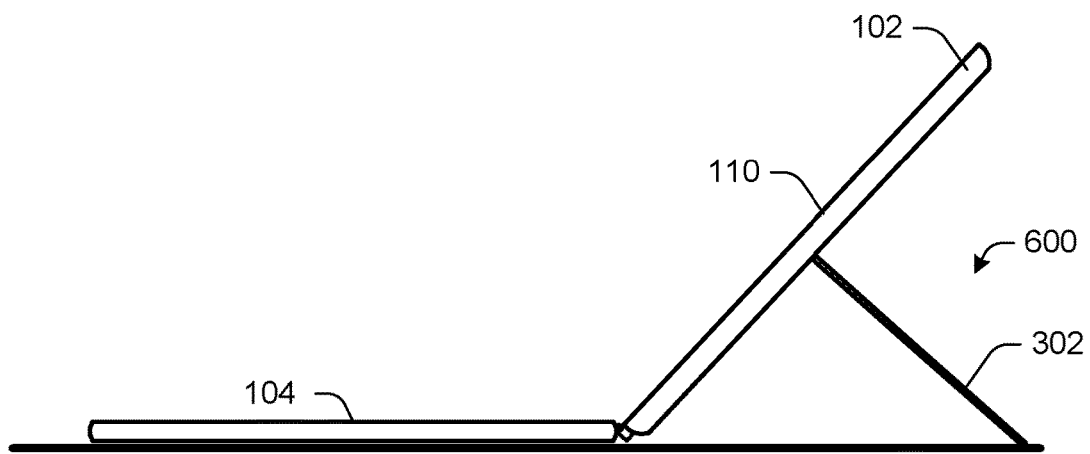
FIG. 6 is a right side view an example orientation of a computing device with a support component.

FIG. 6 illustrates that the support component 302 can be rotated further past the position 500 to a position 600. In the position 600, the computing device is reclined in comparison to previously-discussed orientations, such as the position 500. As illustrated, the position 600 presents the display device 110 at a more open angle that supports different usage scenarios. For instance, the position 600 supports use of the client device 102 in a user's lap, such as during air travel. A variety of other usage scenarios are supported by the position 600, such as for tall users that may have a higher viewing angle, use on a low surface (e.g., a coffee table), and so forth.

Figure 7:
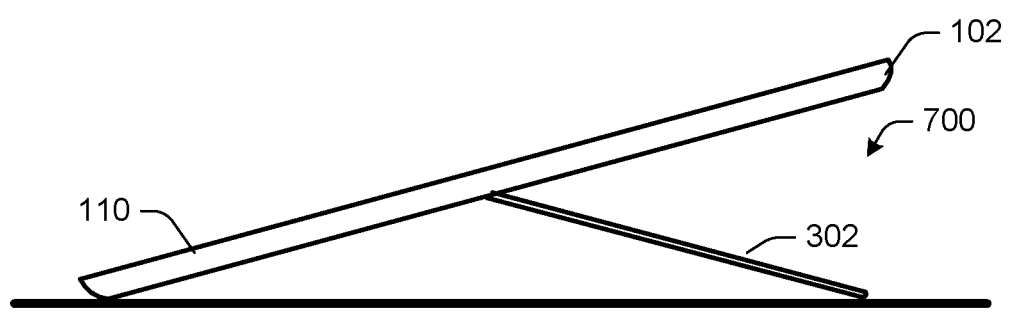
FIG. 7 is a right side view of an example orientation of a computing device with a support component.

FIG. 7 illustrates that the support component 302 can be rotated further from the position 600 to a position 700. FIG. 7 also depicts that the input device 104 is detached from the client device 102. As discussed above, the input device 104 is removably attached to the computing device 104 to support a variety of different usage scenarios.

Figure 8:
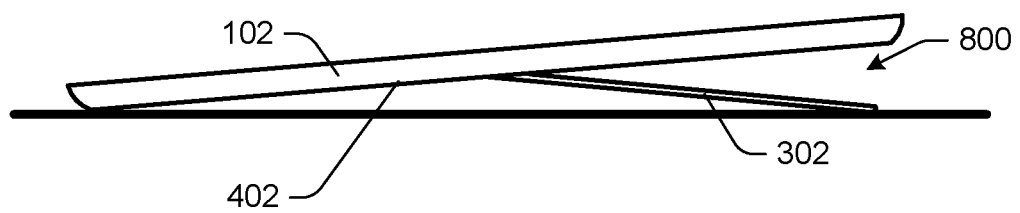
FIG. 8 is a right side view of an example orientation of a computing device with a support component.

FIG. 8 illustrates that the support component 302 can be rotated further away from the rear surface 402 of the client device 102 to a position 800. For instance, the support component 302 can be rotated further past the position 700 to the position 800. Generally, the support component 302 is held in the position 800 via a hinge, e.g., hinge 114 (FIG. 1), examples of which are detailed below.

In at least some implementations, the position 800 represents maximum open position for the support component 302. In some implementations, a hinge that attaches the support component 302 to the client device 102, for example, may not open further past the position 800.

Figure 9:
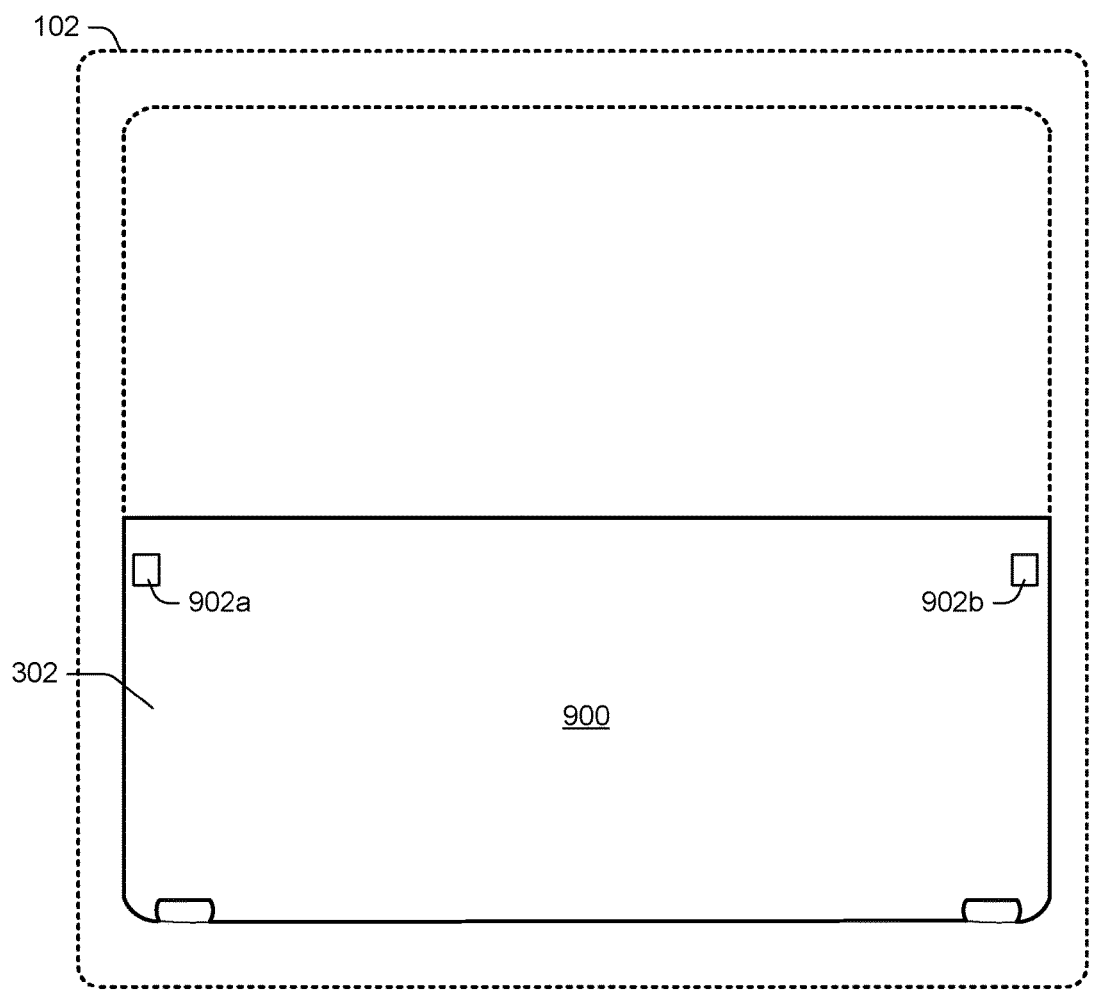
FIG. 9 is a front plan view of an example inner surface of a support component relative to a computing device (outlined with dashed lines)

FIG. 9 illustrates a view of an inner surface 900 of the support component 302. In this example, the support component 302 is illustrated in the context of an outline of a chassis of the client device 102, indicated via dashed lines. The inner surface 900 includes hinge mounts 902a, 902b, which function as mounting points for connecting the hinges that are employed to attach the support component 302 to the client device 102. Examples of such hinges, e.g., hinge 114 (FIG. 1), are discussed below.

A variety of different hinges can be employed for attaching various components in accordance with various implementations. Some example hinges and hinge arrangements are discussed below.

Figure 10:
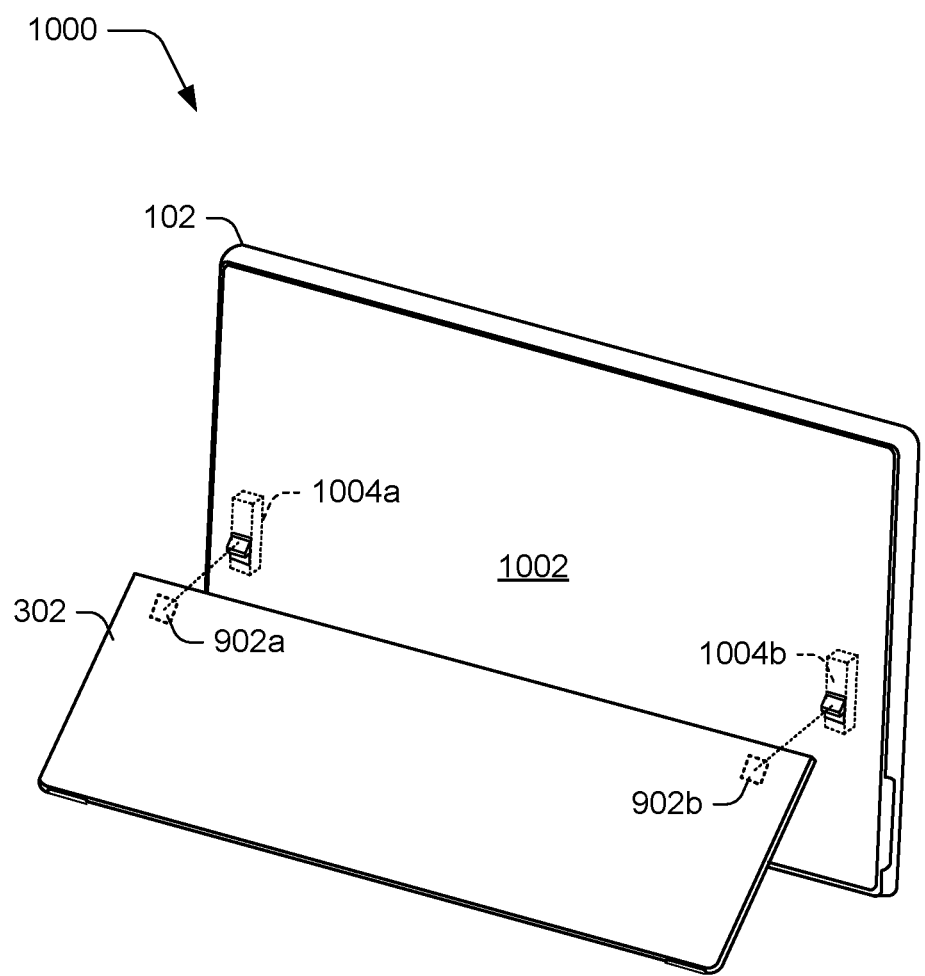
FIG. 10 is a rear perspective exploded view of a computing device and an example support component rotatably connected the computing device via example hinges (outlined with imaginary lines)

FIG. 10 illustrates an exploded rear view 1000 of a chassis 1002 of the client device 102 and the support component 302. The support component 302 is rotatably connected to the chassis 1002 via hinges 1004a and 1004b, illustrated in imaginary lines. The hinges 1004a, 1004b are fixedly attached to an internal surface of chassis 1002, within the client device 102, such as via a suitable attachment method and/or device.

The support component 302 can be attached to a pivoting portion of the hinges 1004a, 1004b via the hinge mounts 902a, 902b. Thus, attachment to the hinges 1004a, 1004b enables the support component 302 to pivot between various positions relative to the client device 102.

Referring to FIGS. 11, 12-1, 12-2, 13-1, and 13-2, the components of representative hinges 114 and 114', and the respective functionality of such components, will be discussed in detail.

Referring to FIGS. 14-23, the operating of hinge 114 and its components during opening and closing movements is discussed in detail.

Figure 2:
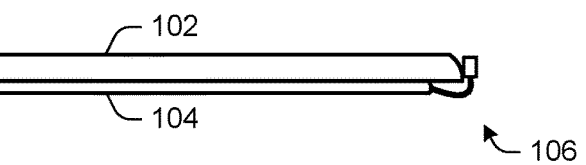
FIG. 2 is a right side view of an example orientation of a computing device facing down with an input device covering a display device of the computing device.
Figure 11:
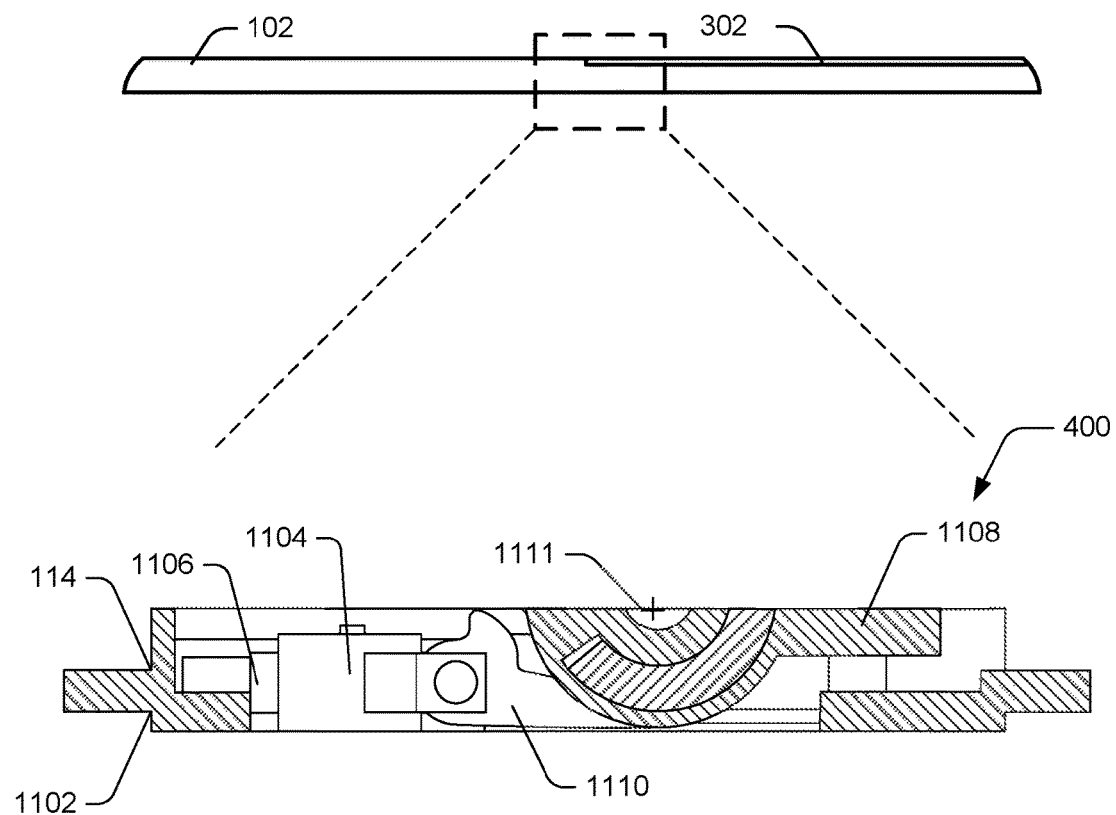
FIG. 11 depicts a cutaway right side view (with rear facing up and top end to the left) of an example hinge in a closed position, additionally including a reference to an example location of the example hinge in the computing device.
Figures 1, 12:
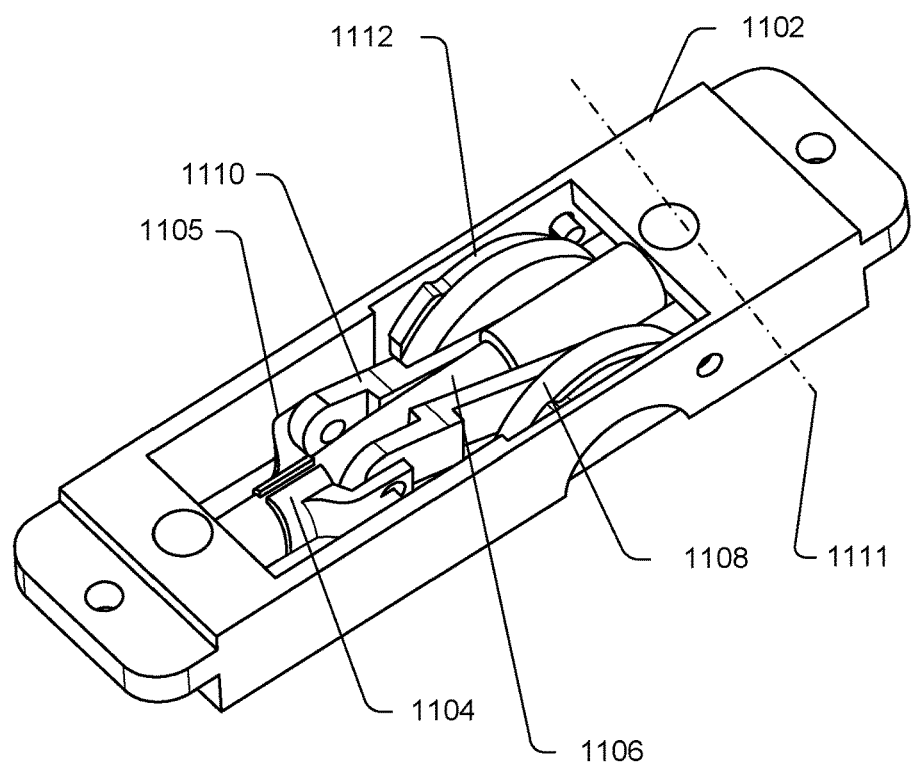
Figures 2, 12:
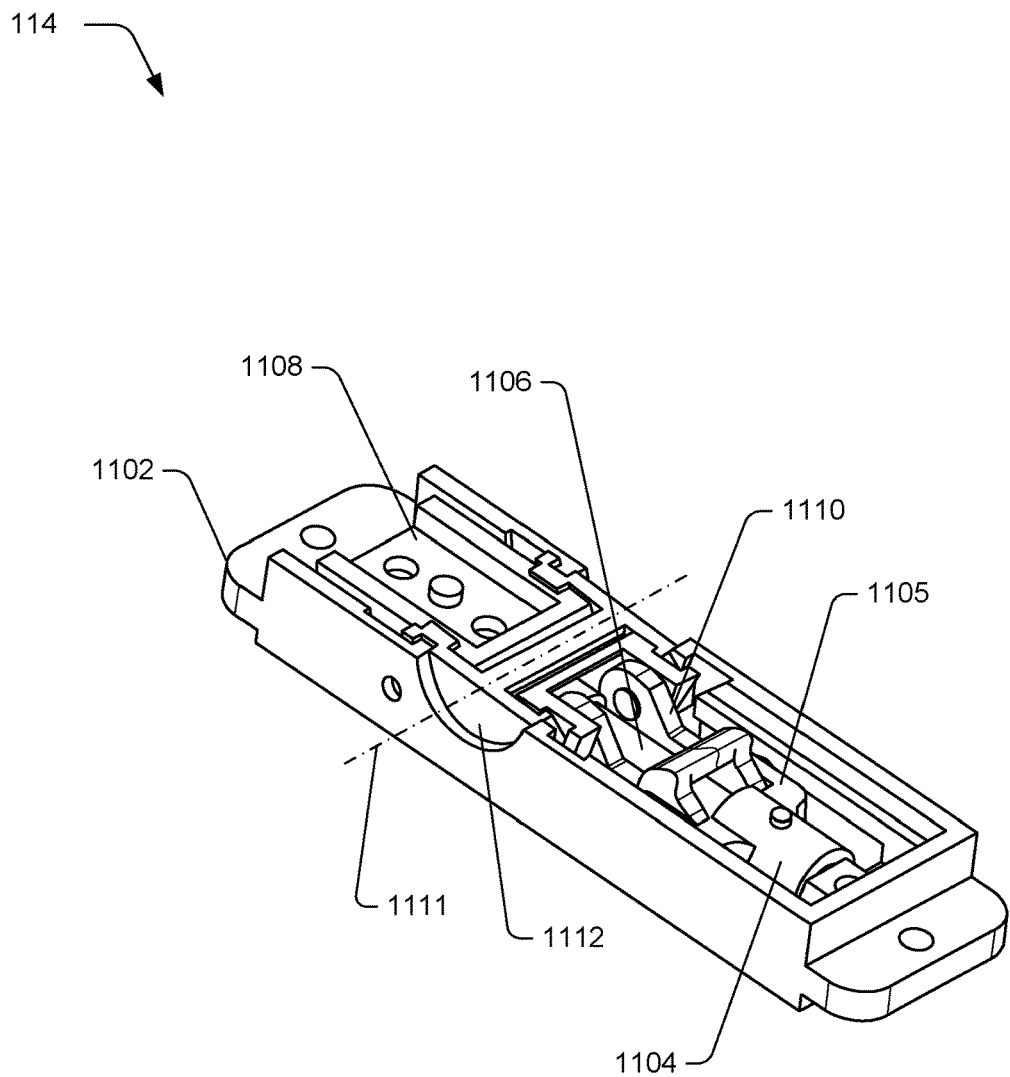
Figures 3, 12:
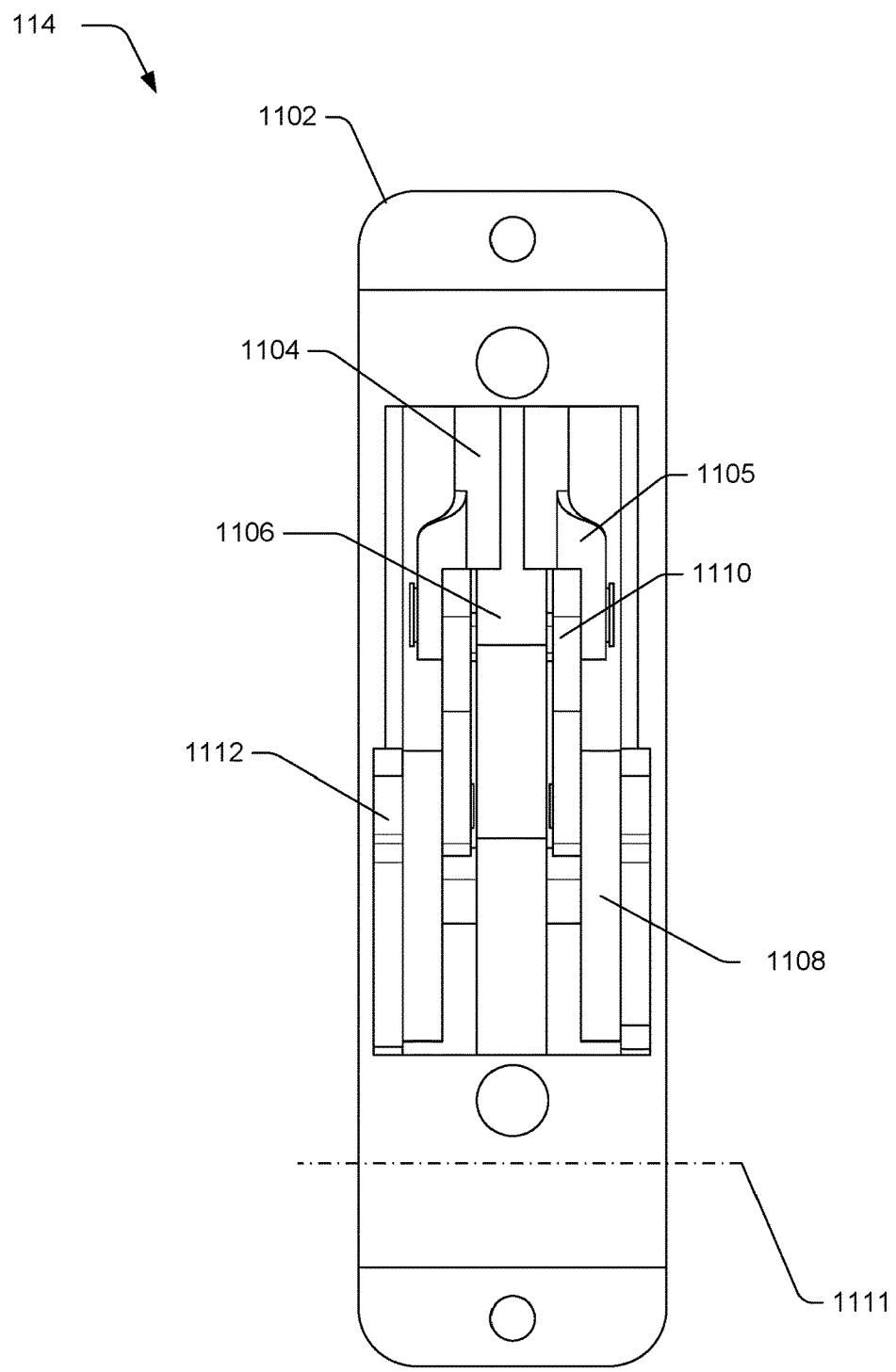
Figures 4, 12:
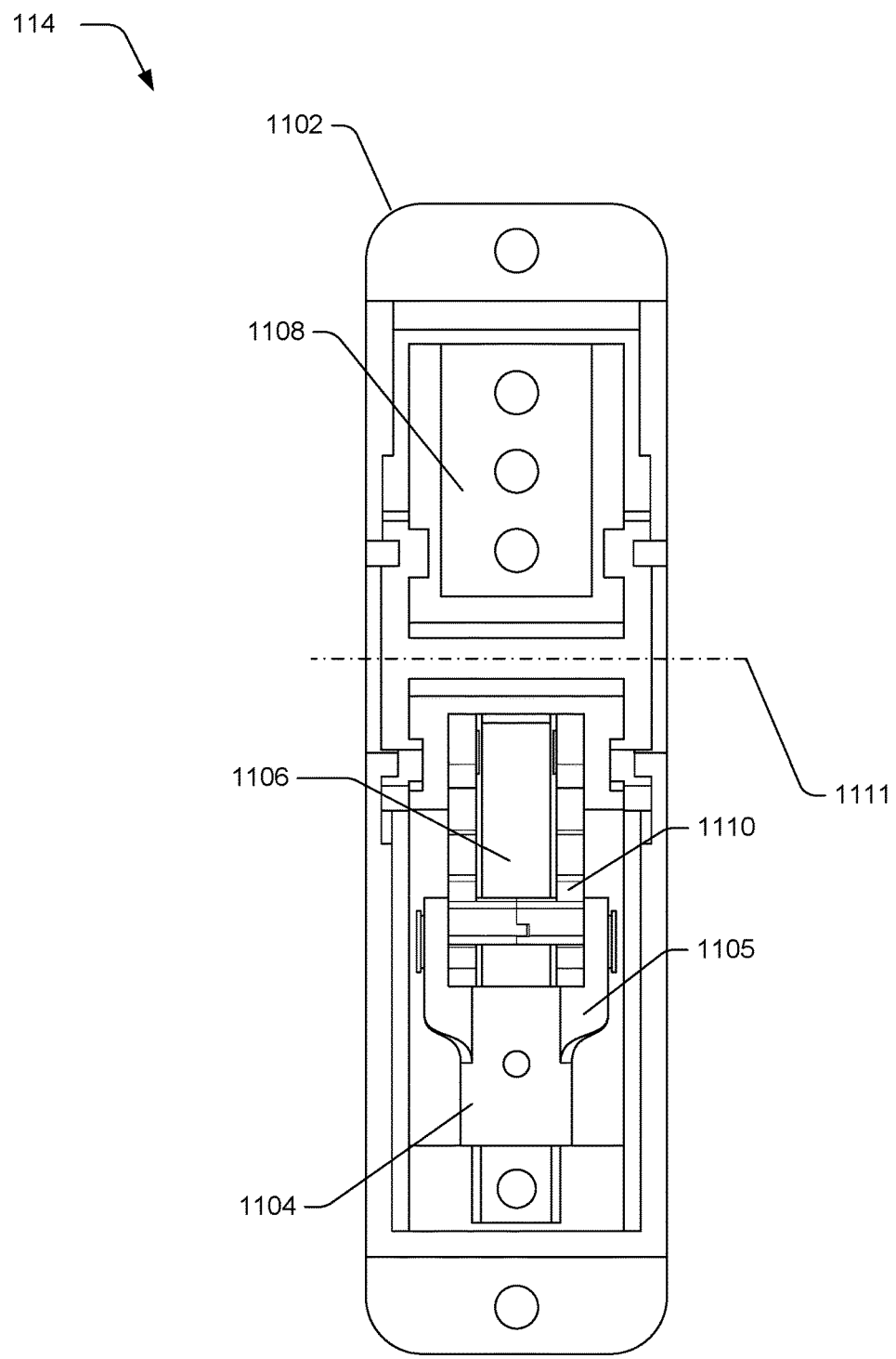
Figures 5, 12:
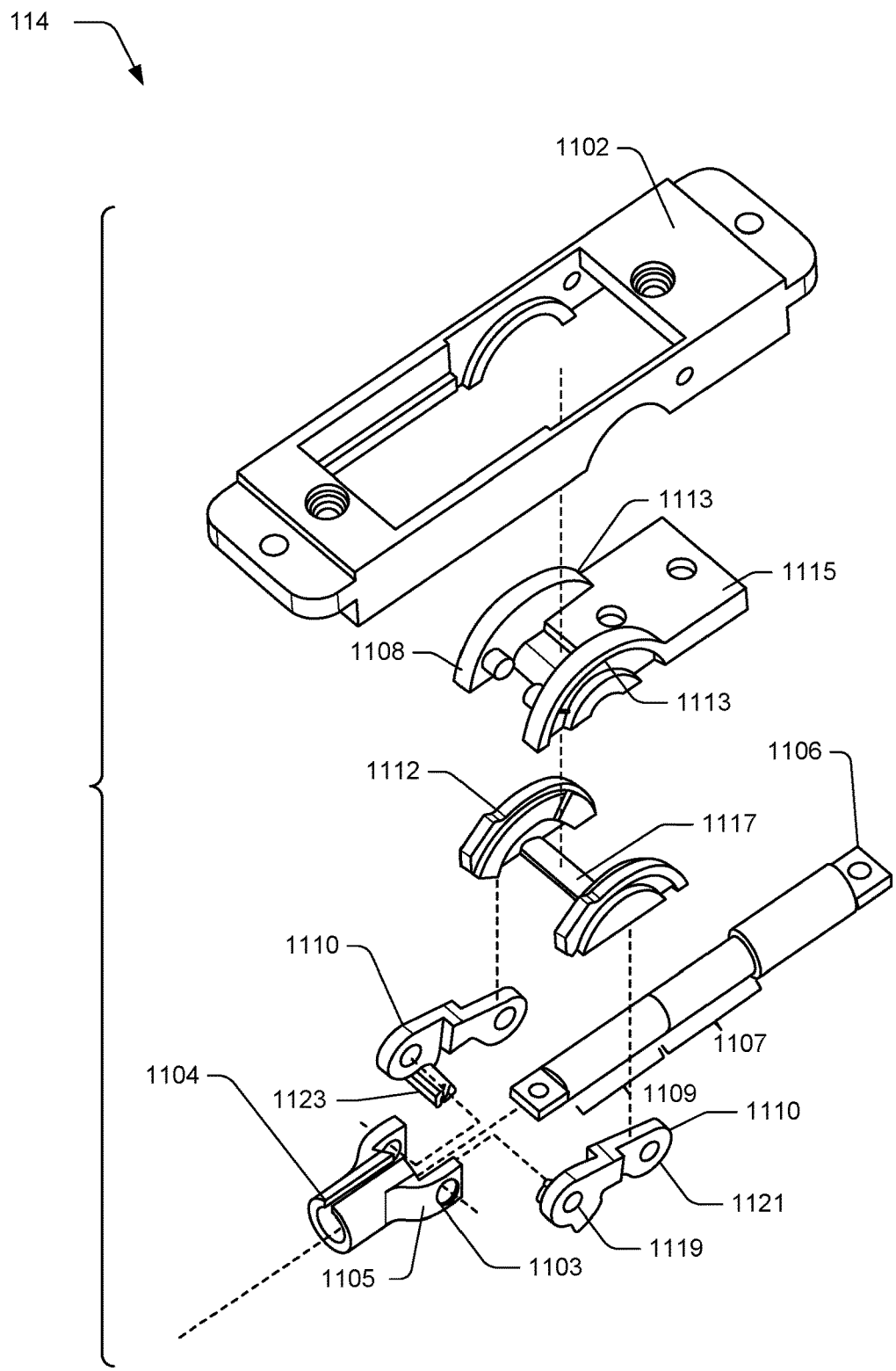
Figures 1, 13:
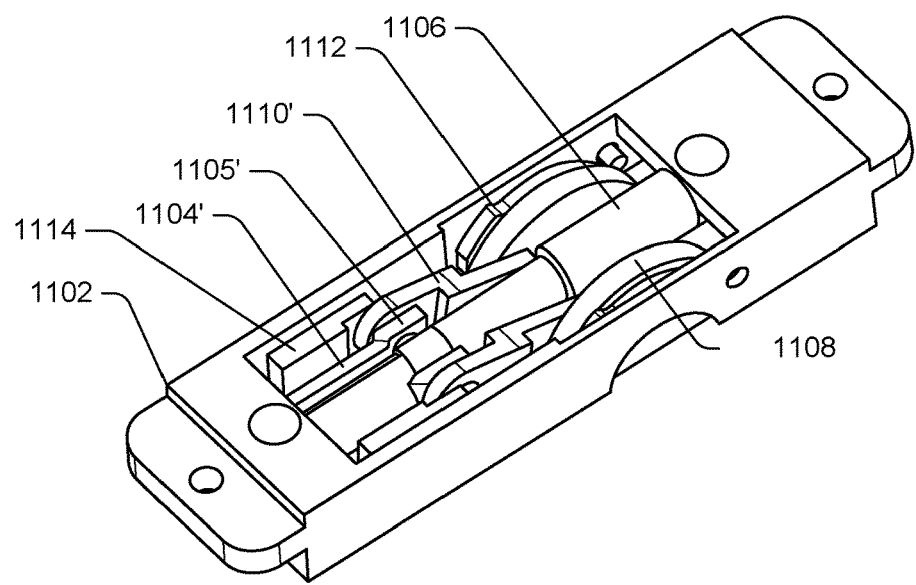
Figures 2, 13:
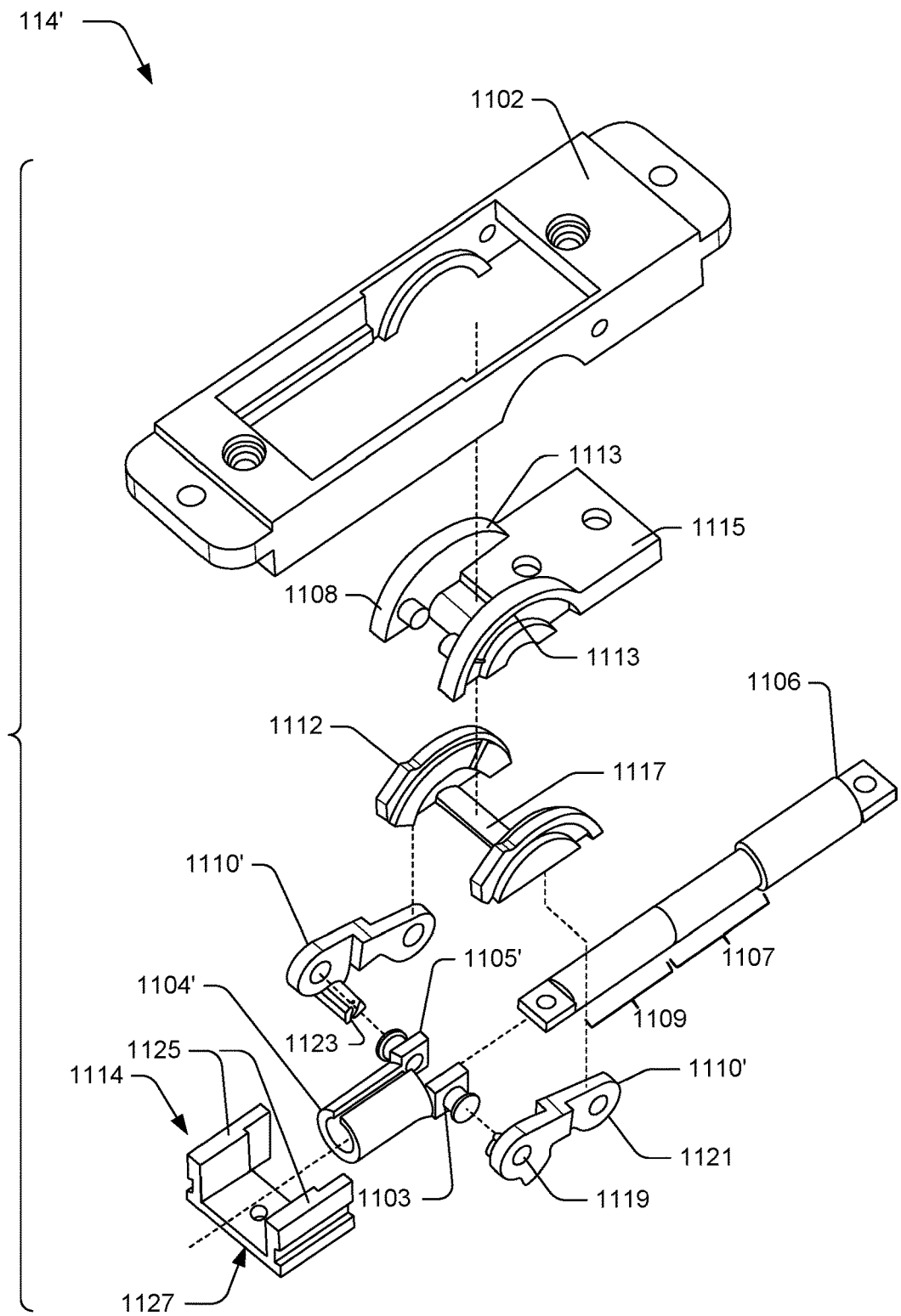

FIG. 11 depicts a cutaway side view of an example hinge in a closed position, additionally including a reference to an example location of the example hinge in the computing device, and FIGS. 12-1, 12-2, 12-3, 12-4, and 12-5, and FIGS. 13-1 and 13-2, depict a perspective view and an exploded view, respectively, of different examples of a representative hinge, e.g. hinge 114 (FIGS. 11, 12-1, 12-2, 12-3, 12-4, and 12-5) and hinge 114' (FIGS. 13-1 and 13-2). The hinge 114 and the hinge 114', for instance, represent implementations of the hinges 1004a, 1004b discussed above. This is not intended to be limiting, however, and the hinge 114 or 114' can be employed as a hinge mechanism for a variety of different components and in a variety of different attachment scenarios. The hinge 114 or 114' and its various components can be formed using any suitable material and/or combination of materials, such as metals, plastics, polymers, alloys, and so forth. Generally, the view depicted in FIGS. 11, 12-1, 12-2, 12-3, 12-4, 12-5, 13-1, and 13-2 represents the hinge 114 or 114' in a closed position, such as the position 400 depicted in FIG. 4.

The hinge 114 or 114' includes a hinge frame 1102 in which various components of the hinge 114 or 114' are disposed. In an implementation, the hinge frame 1102 includes opposing side walls connected via opposing top and bottom walls to define an open frame. Additionally, a top flange and a bottom flange respectively may extend from the top wall and the bottom wall away from the hinge frame 1102. The hinge frame 1102 can be mounted to and/or within a device (e.g., the chassis 1002 of the client device 102, see FIG. 10), for example via the top and bottom flanges, and function as a support structure for other components of the hinge 114 or 114'.

The hinge 114 or 114' includes an elongated member 1106 attached at both ends to opposing structures of the hinge frame 1102. For example, elongated member 1106 may include an attachment structure, such as but not limited to a flange, at opposing ends of the elongated member 1106. The attachment structures may be fixedly attached to corresponding attachment structures, such as but not limited to walls or surface of hinge frame 1102, via a connecting mechanism, such as but not limited to a screw, a bolt (and nut), a weld, an adhesive, etc.

The hinge 114 or 114' may also include an engagement member 1104 or 1104' slidably engaged with the elongated member 1106, the combination of which at least partially defines the sliding friction feature 116 discussed above with respect to FIG. 1.

The elongated member 1106 may have a longitudinally-extending ramped surface, e.g., a sloped surface, on at least a first portion 1107 of the elongated member 1106, and may have one or more level surfaces, such as at second portion 1109. The engagement member 1104 or 1104' includes at least one surface that is biased toward a corresponding surface of the elongated member 1106 so as to cause the surfaces to contact one another at one or more points. That is, elongated member 1106 and engagement member 1104 or 1104' have complementary surfaces that are in contact as a result of the biasing force applied by at least one surface of engagement member 1104 or 1104'. Although elongated member 1106 is illustrated as a shaft and engagement member 1104 or 1104' as including a base portion or mounting flanges 1105 having an extending portion or circular band 1103 encompassing the shaft, it should be understood that elongated member 1106 and engagement member 1104 or 1104' may have a variety of other shapes. For instance, elongated member 1106 and engagement member 1104 or 1104' may have corresponding slidably engaged flat surfaces. Moreover, the surface of elongated member 1106 in contact with engagement member 1104 may be an exterior surface, such as the illustrated exterior shaft surface, or an interior surface, such as the surface of a channel in a body of the elongated member 1106. In any arrangement, engagement member 1104 is biased against elongated member 1106, and a sliding friction between the two may vary along at least a portion of the length of the elongated member 1106 due to a change in slope of the contact surface (e.g., an amount of change in surface height relative to a longitudinal axis over a longitudinal distance).

The hinge 114 or 114' may also include a pivot member 1108 pivotably engaged with the hinge frame 1102, and attached to the support component 302 (FIGS. 1 and 3-10). Pivot member 1108 includes two partial disk portions 1113 that rotatably connect with the hinge frame 1102, and a flange portion 1115 that interconnects and longitudinally extends away from the partial disk portions 1113. The flange portion 1115 includes a rear-facing surface to which support member 302 may be affixed, e.g., via hinge mounts 902a and 902b (FIG. 9). Further, pivot member 1108 has an axis of rotation 1111 that lies in a plane parallel to about a rear surface of hinge 114 or 114', which enables a size of the seam 502 (FIG. 5) between support member 302 and rear surface 112 of client device 102 to be minimized. For instance, the engagement member 1104 or 1104' is configured to slide along the elongated member 1106 during pivoting of the pivot member 1108 relative to the hinge frame 1102. The sliding of the engagement member 1104 or 1104' along the ramped surface of the first portion 1107 of the elongated member 1106 causes variations in a sliding friction based on an amount of change in surface height over longitudinal distance of the ramped surface, thereby contributing to a torque profile of the hinge 114 or 114' and allowing support component 302 to maintain a relative position, e.g., with respect to client device 102. As further detailed below, interaction of the engagement member 1104 or 1104' with the elongated member 1106 affects resistance to movement of the hinge 114 or 114' to different positions.

Thus, according to various implementations, the pivot member 1108 is pivotably engaged within the hinge frame 1102 to enable the pivot member 1108, and thus an attached component (e.g., the support component 302) to pivot between various positions. Correspondingly, as further detailed below, when the hinge 114 or 114' is moved between various positions, the engagement member 1104 or 1104' slides along the elongated member 1106.

Further, hinge 114 or 114' includes one or more support plates 1112 to provide support for the pivot member 1108 when the hinge 114 or 114' is in various open positions. Support plates 1112 rotatably connect pivot member 1108 to inside of the side walls of hinge frame 1102, and also are independently rotatable relative to pivot member 1108. In particular, support plates 1112 essentially provide a compact, sliding extension to partial disks 1113 thereby substantially extending the allowable rotation of pivot member 1108, e.g., such that pivot member 1108 may rotate nearly 180 degrees. While implementations are discussed herein with reference to two support plates 1112, which may be connected by an axle 1117, it is to be appreciated that alternative implementations may utilize a single support plate (e.g., one of support plate 1112) within the spirit and scope of the claimed implementations.

Accordingly, the support plates 1112 represent an arcuate protrusion on the inner surface of the hinge frame 1102 that engages with the support plate 1112 and guides rotation of the support plate 1112 relative to the hinge frame 1102. A plate slot of the support plate 1112, for instance, engages with a support guide to control movement of the support plate 1112 when the pivot member 1108 is pivoted between various positions.

Additionally, hinge 114 or 114' includes linkage members 1110 or 1110' that connect the engagement member 1104 or 1104' to the pivot member 1108. For instance, the linkage members 1110 have a first end 1119 and second end 1121, the first end 1119 rotatably connected with the engagement member 1104 or 1104' and the second end 1121 rotatably connected with the pivot member 1108. Additionally, opposing linkage members 1110 or 1110' on either side of engagement member 1104 or 1104' may be connected by a lateral member 1123, which may also service as a rotational stop to limit rotation of pivot member 1108.

In the implementation of hinge 114, each first end 1119 of the one or more linkage members 1110 is captured between the base portion or mounting flanges 1105 of engagement member 1104.

Alternatively, in the implementation of hinge 114', each first end 1119 of the one or more linkage members 1110' is located outside of the base portion of mounting flanges 1105' of engagement member 1104. However, the implementation of hinge 114' may further include a guiding component 1114 having side walls 1125 that restrain lateral movement of each first end 1119 of the one or more linkage members 1110' but that slidably attach to the inside of the hinge frame 1102. For instance, guiding component 1114 may have a bottom wall 1127 that connects side walls 1125, and that also may include an attachment member (e.g. a hole into which a pin on engagement member 1104' may snap). Thus, the guiding component 1114 moves within the hinge frame 1102 in correspondence with the movement of the engagement member 1104', and holds each first end 1119 of each linkage member 1110' in rotatable engagement with base portion or mounting flanges 1105' of engagement member 1104'.

In comparing the structure of hinge 114 to hinge 114', engagement member 1104 of hinge 114 may be configured to slide along elongated member 1106 without the use of guiding component 1114 as the flanges 1105 of engagement member 1104 retain linkage members 1110. In this example, the linkage members 1110 are rotatably connected to the interior of the mounting flanges 1105 of engagement member 1104, so that engagement member 1104 slides along elongated member 1106 without the restraint on the lateral movement of each first end 1119 of the one or more linkage members 1110, e.g., as compared to the structure of hinge 114'. This results in hinge 114 having fewer components, which may reduce the cost and/or improve the efficiency of operation of hinge 114.

Thus, the arrangement of pivot member 1108 rotatably supported in hinge frame 1102 by support plates 1112 and rotatably connected to one end of linkages 1110 or 1110', which rotatably connect to engagement member 1104 or 1104', which applies a variable sliding friction or engagement force to elongated member 1106 defines a friction hinge 114 or 114' having a configurable torque profile that enables, for example, support component 302 to resist at least the weight of client device 102 (and possible additional force, such as a touch of a finger on a display 110 of client device) and maintain a given relative position.

Moreover, the above arrangement enables hinge 114 or 114' to be designed with a compact size, e.g., with a minimal height, by transforming the rotational motion of pivot member 108 into linear motion of engagement member 1104 or 1104' against elongated member 1106. Yet, the above arrangement allows hinge 114 or 114' to have a configurable torque profile based on adjusting the amount of sliding friction during the linear movement.

Figure 14:
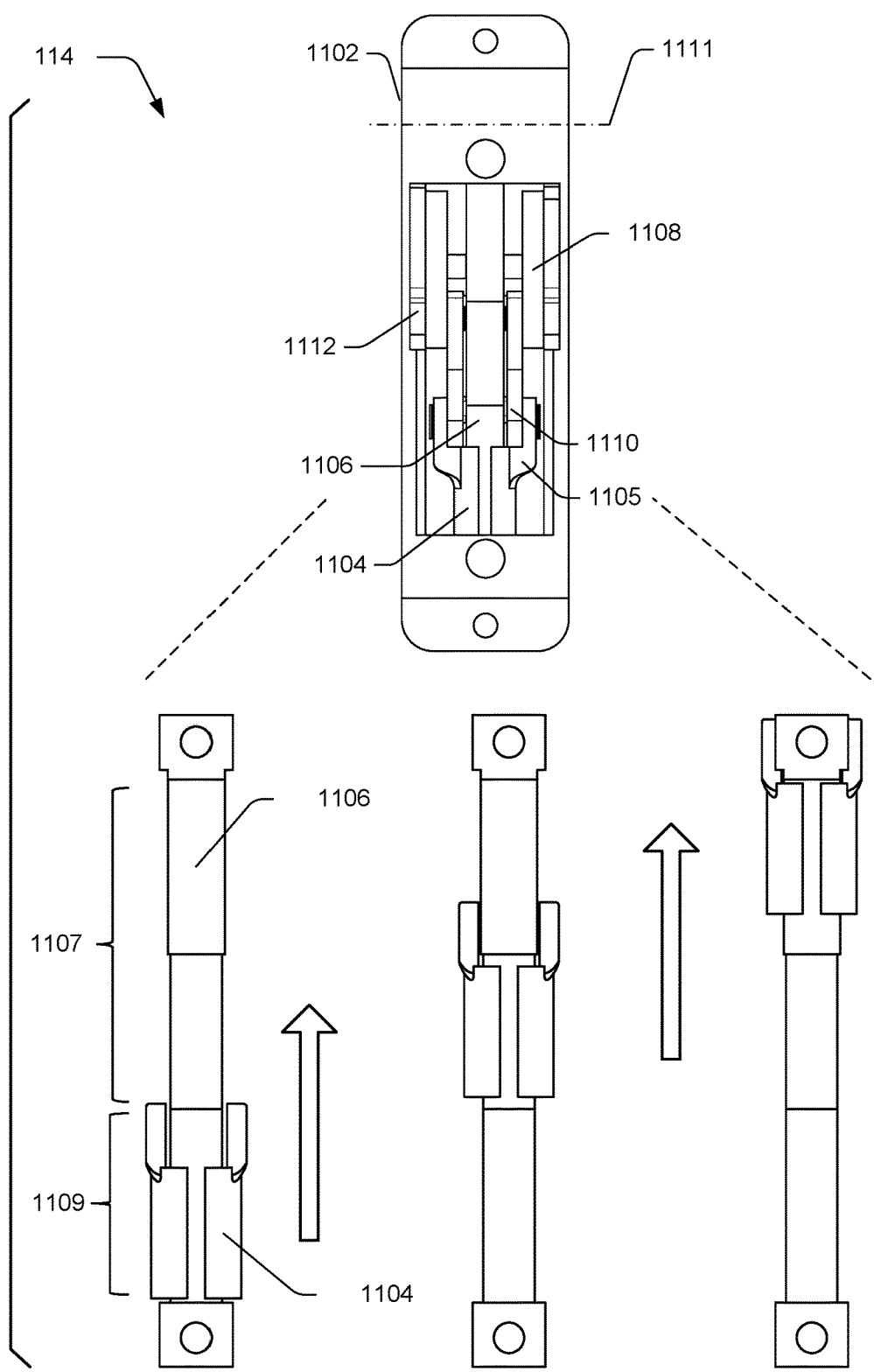
FIG. 14 depicts a front left side perspective view of an example hinge including respective enlarged front views of an engagement member slidably engaged with an elongated member at various positions.

FIG. 14 depicts a front left side perspective view of an example hinge 114 including respective enlarged front views of an engagement member 1104 slidably engaged with an elongated member 1106 at various positions in accordance with one or more implementations. Generally, the view depicted in FIG. 14 represents the hinge 114 in a closed position, such as the position 400 depicted in FIG. 4. The side cutaway view illustrates the hinge frame 1102 with various other components of the hinge 114, including the elongated member 1106, the engagement member 1104, and a pivot member 1108. According to various implementations, the pivot member 1108 represents a portion of the hinge 114 to which a moveable component can be attached. For instance, the support component 302 can be attached to the pivot member 1108 to enable pivoting movement of the support component 302 relative to the client device 102.

As illustrated, the elongated member 1106 and the engagement member 1104 are positioned within the hinge 114. For instance, in this implementation, the engagement member 1104 at least partially wraps around the elongated member 1106.

Further depicted in FIG. 14 is the support plate 1112 engaged with a support guide (not visible) on an inner wall of hinge frame 1102 and the pivot member 1108. According to various implementations, the support plate 1112 represents a semi-cylindrical element that is fixed to the hinge frame 1102 and engages the pivot member 1108. The support plate 1112 rotates relative to the pivot member 1108 when the pivot member 1108 pivots between various positions. The support plates 1112 slidably engage with one or more support guides on an interior surface of the hinge frame 1102. Further, the pivot member 1108 slidably engages with the one or more support plates 1112 such that the pivot member 1108 is rotatable from within the hinge frame 1102 to a position outside of the hinge frame while remaining engaged with the one or more support plates 1112.

The lower portion of FIG. 14 depicts an enlarged view of isolated front views of the engagement member 1104 engaged with the elongated member 1106. As shown, the engagement member 1104 is slidably engaged with the elongated member 1106. According to various implementations, the physical interface between the engagement member 1104 and the elongated member 1106 provides sliding resistance to pivoting of the pivot member 1108 relative to the hinge frame 1102, and thus resistance to movement of a component that is attached to the pivot member 1108, such as the support component 302.

In an implementation, the elongated member 1106 comprises a shaft having an increasing diameter along the first portion 1107 of elongated member 1106. Accordingly, the engagement member 1104 has a first engagement force at first position along the ramped surface of the first portion 1107 of the elongated member 1106 and a second engagement force at a second position along the ramped surface of the first portion 1107 of the elongated member 1106. In some implementations, the second engagement force is different from the first engagement force.

Generally, the sliding of the engagement member 1104 along different portions of the elongated member 1106 affects the sliding friction, and thus affects a torque response of the hinge 114. The angle of the support component 302, for instance, is determined based on the position of the engagement member 1104 along the elongated member 1106. Accordingly, the elongated member 1106 is divided into sliding portions ("portions"), e.g., first portion 1107 having a sloped surface and second portion 1109 having a level surface or surface with zero slope, that affect a torque response of the hinge 114 in various ways. In this example, the elongated member 1106 includes the first portion 1107 and the second portion 1109. These particular portions are presented for purpose of example only, and it is to be appreciated that implementations for friction hinge can utilize any number and/or configuration of portions.

According to various implementations, each of the portions 1107 and 1109 can be either ramped or non-ramped, although at least one portion is ramped. For instance, the sliding of the engagement member 1104 along the ramped surface of the elongated member 1106 causes variations in a sliding friction based on an amount of change in surface height over longitudinal distance of the ramped surface.

In an implementation, the engagement member 1104 at least partially wraps around an outer surface of the elongated member 1106. In an implementation, the engagement member 1104 comprises a base portion 1105 and at least one extending member 1103 extending from the base portion 1105. The at least one extending member 1103 includes opposing walls that slidably engage the shaft, wherein the opposing walls are elastically and/or resiliently deformable in response to movement of the at least one extending member 1103 along the first portion 1107 of the shaft of elongated member 1106. The engagement member 1104, for example, is biased against the elongated member 1106 and may slide relative to the elongated member 1106. Thus, the linear movement of engagement member 1104 along elongated member 1106 results in variable sliding friction that contributes to a torque profile of the hinge 114 when the hinge 114 is moved between various positions.

Generally, these different components of the hinge 114 interact during movement of the hinge 114 to provide a particular responsiveness profile over different hinge positions. These and other components of the hinge 114 are detailed in subsequent figures and discussion.

According to various implementations, the frictional interface between the engagement member 1104 and the elongated member 1106 keeps the pivot member 1108 in a closed position and provides a certain amount of resistance to opening of the hinge 114. For instance, resistance to sliding of the engagement member 1104 relative to the elongated member 1106 prevents the support component 302 from sagging relative to the client device 102, and provides resistance to opening of the support component 302 from a closed position.

As discussed herein, "opening" of the support component 302 and/or the hinge 114 refers to a movement of the support component 302 and/or the hinge 114 away from a closed position (e.g., the position 400) toward an open position. Further, "closing" of the support component 302 and/or the hinge 114 refers to a movement of the support component 302 and/or the hinge 114 from an open position toward a closed position, e.g., toward the position 400.

As illustrated in this implementation, the engagement member 1104 does not fully enclose the elongated member 1106, and thus extending portion 1103 can move (e.g., in this partially circular band example, increase or decrease in diameter). Accordingly, when the engagement member 1104 slides in response to the pivot member 1108 pivoting in an opening direction, resistance to movement of extending portion 1103 causes increasing friction at the interface between the engagement member 1104 and the elongated member 1106. In other words, engagement member 1104 increasingly tightens around the elongated member 1106 as the engagement member 1104 linear moves along the increasingly sloped surface of the elongated member 1106, thus contributing to the torque profile of the hinge 114 when the hinge 114 is opened. Further, when the pivot member 1108 is pivoted toward a closed position, the engagement force applied by the engagement member 1104 to the elongated member 1106, and hence sliding friction, reduces as the engagement member 1104 linearly moves toward reduced sloped surfaces of the elongated member 1106, thus contributing to the torque profile of the hinge 114 when the hinge 114 is closed. In at least some implementations, tightening of the engagement member 1104 around the elongated member 1106 when the hinge 114 is moved in an opening direction results in greater friction between the engagement member 1104 and the elongated member 1106 than when the hinge 114 is moved in a closing direction.

According to various implementations, when the hinge 114 pivots in an opening direction, the linkage members 1110 that are rotatably connected with the engagement member 1104 and the pivot member 1108 are engaged. For instance, each linkage member 1110 has a first end 1119 rotatably connected with the engagement member 1104 and a second end 1121 rotatably connected with the pivot member 1108. In this implementation, when the hinge 114 pivots in the opening direction, the pivot member 1108 rotatably engages the second end 1121 of the linkage members 1110, which in turn, cause the first end 1119 of the linkage members 1110 to rotatably engage with the engagement member 1104. Accordingly, the first end 1119 of the linkage members 1110 rotatably engaging with the engagement member 1104 cause linear movement of the engagement member 1104 to slidably engage with the elongated member 1106.

For purposes of determining torque response of the hinge 114 when moving in an opening direction and closing direction, the slope factor of the ramped portion of the elongated member 1106 may be based on an angle of the surface of the elongated member 1106 relative to the linear direction of movement of the engagement member 1104. For example, a shaft diameter of the elongated member 1106 contributes to the sliding friction and thus the torque response of the hinge 114 when moving in either the opening direction or closing direction.

In various implementations, moving the support component 302 from a closed position relative to the client device 102 to a first open position relative to the client device 102 causes opening of the hinge 114 such that the engagement member 1104 slides along a second portion 1109 of the elongated member 1106 having a substantially constant sliding friction, e.g., due to a level or non-sloping surface. Further, moving the support component 302 from the first open position relative to the device to the closed position relative to the device causes closing of the hinge 114 such that the engagement member 1104 slides along the second portion 1109 of the elongated member 1106.

Moreover, in various implementations, moving the support component 302 from a first open position relative to the device to a second open position relative to the device causes further opening of the hinge 114 such that the engagement member 1104 slides along the elongated member 1106 from the second portion 1109 of the elongated member 1106 to the first portion 1107 of the elongated member 1106. For instance, the engagement member 1104 sliding from the second portion 1109 of the elongated member 1106 to the first portion 1107 of the elongated member 1106 increases the sliding friction, and the engagement member 1104 sliding along the first portion 1107 (with increasing slope) of the elongated member 1106 increases the sliding friction.

According to various implementations, moving the support component 302 from a second open position relative to the device to a first open position relative to the device causes closing of the hinge 114 such that the engagement member 1104 slides along the elongated member 1106 from the first portion 1107 of the elongated member 1106 to a second portion 1109 of the elongated member 1106. For instance, the engagement member 1104 sliding along the first portion 1107 of the elongated member 1106 decreases the sliding friction, and the engagement member 1104 sliding from the first portion 1107 of the elongated member 1106 to the second portion 1109 of the elongated member 1106 decreases the sliding friction.

Figure 15:
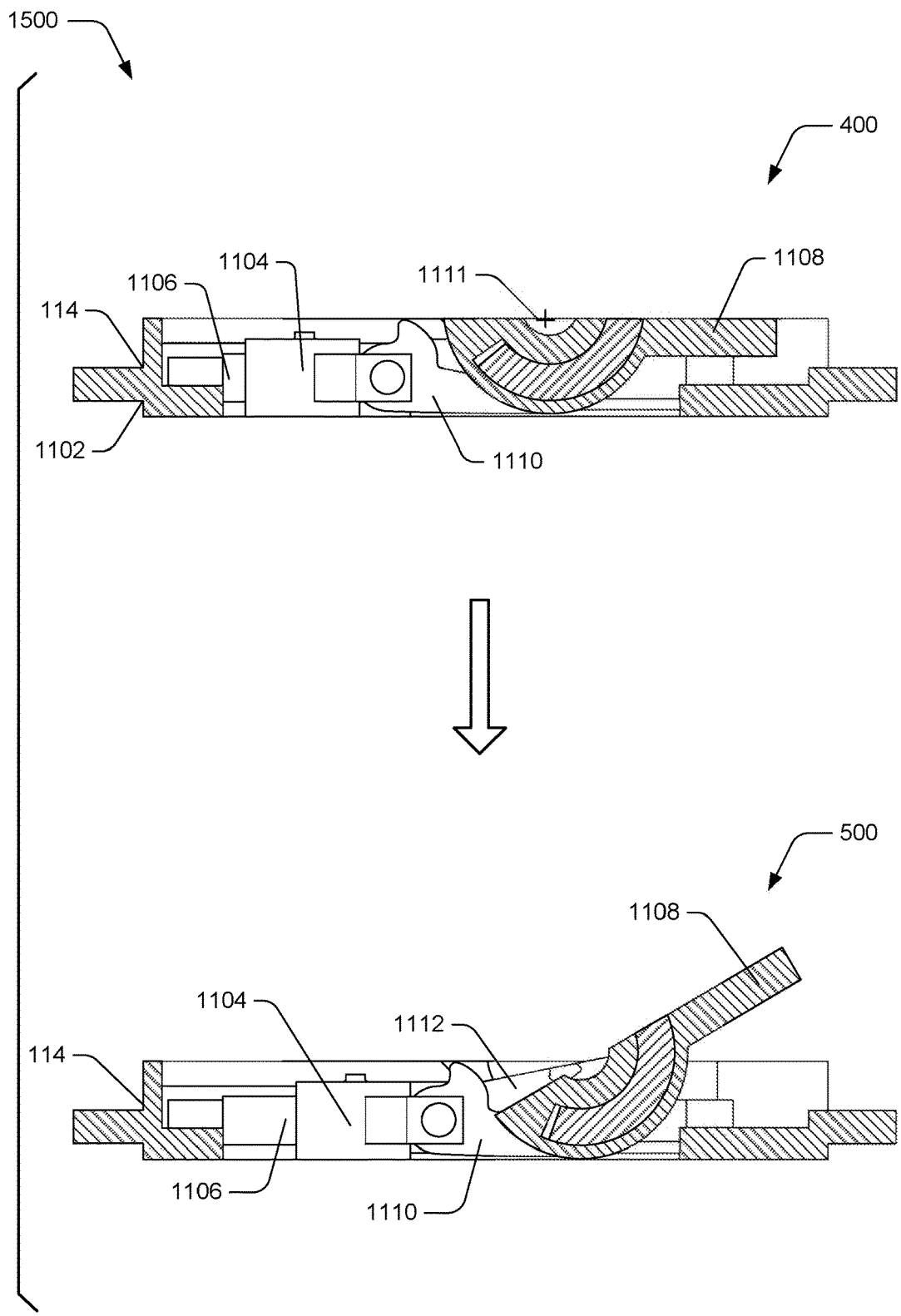
FIG. 15 depicts respective left side (with rear facing up) cutaway views in an implementation scenario for opening of an example hinge.

FIG. 15 depicts a respective left side (with rear facing up) cutaway views in an implementation scenario for opening of an example hinge 114 in accordance with one or more implementations. The depictions of the hinge 114 in the scenario 1500 show a side cutaway view of the hinge 114.

In scenario 1500, the hinge 114 moves from a closed position, such as the position 400, to an opened position 500, e.g., introduced with reference to FIG. 5. For instance, a user manipulates an attached component (e.g., the support component 302) from a closed position to various open positions. Notice that as the hinge 114 opens, the pivot member 1108 pivots relative to the hinge frame 1102. Further, the linkage members 1110 that are rotatably connected with the engagement member 1104 and the pivot member 1108 are engaged.

During movement of the support component 302, the pivot member 1108 rotatably engages the second end 1121 of the linkage members 1110, which in turn, cause the first end 1119 of the linkage members 1110 to rotatably engage with the engagement member 1104. Accordingly, the first end 1119 of the linkage members 1110 rotatably engaging with the engagement member 1104 cause the engagement member 1104 to move in a linear direction and slidably engage with the elongated member 1106. As mentioned above, frictional resistance to sliding of the engagement member 1104 relative to the elongated member 1106 provides torque resistance to pivoting of the pivot member 1108. Generally, the torque resistance to pivoting of the pivot member 1108, and thus an attached component, is referred to as the "torque output" of the hinge 114.

For instance, in this case of scenario 1500, movement of the support component 302 from the closed position 400 relative to the device to a first open position 500 relative to the device causes opening of the hinge 114 such that the engagement member 1104 slides along the second portion 1109. Since the second portion 1900 has a level or zero slope relative to the direction of movement of engagement member 1104, the movement of elongated member 1106 from position 400 to position 500 is associated with a substantially constant sliding friction. In other words, the second portion 1109 of the elongated member 1106 has a substantially level surface, so the linear movement of engagement member 1104 along elongated member 1106 does not increase the engagement force and/or the friction force. This substantially constant amount of sliding friction can be represented in the torque output of the hinge 114, an example of which is demonstrated via the torque curves presented in FIG. 24.

Figure 16:
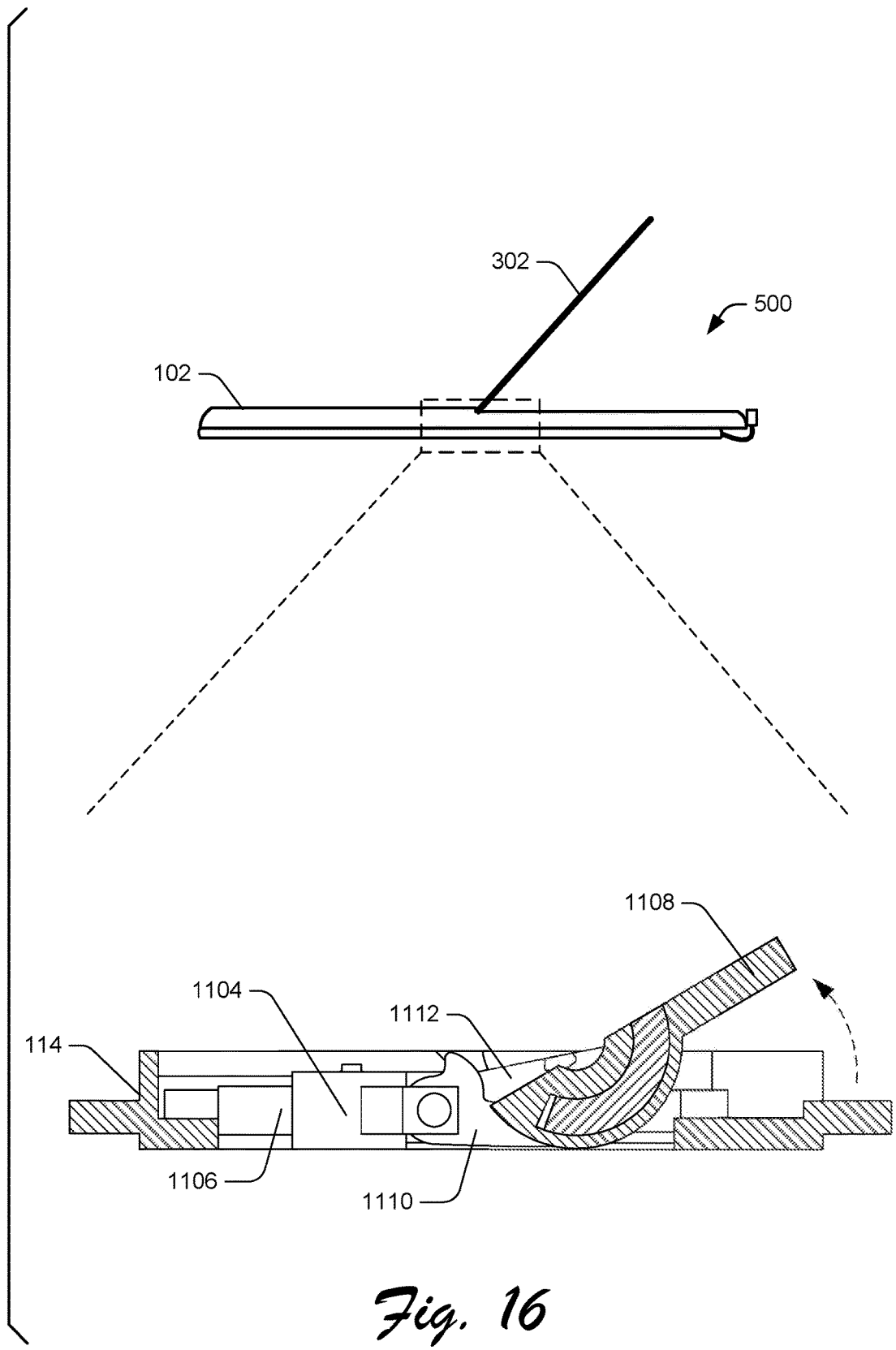
FIG. 16 depicts a left side (with rear facing up) cutaway side view of an example hinge and a corresponding open position of a support component of a computing device.

FIG. 16 depicts a left side (with rear facing up) cutaway side view of an example hinge 114 and a corresponding open position of a support component 302 of a computing device in accordance with one or more implementations. For instance, a user manipulates the support component 302 from the position 400 (e.g., a closed position relative to the client device 102) to the open position 500 as described above with respect to FIG. 15. Shown here is the client device 102, the support component 302, along with different components of the hinge 114 introduced above.

According to various implementations, the torque response of the hinge 114 is such that absent externally applied force, the hinge 114 relative to an attached component such as client device 102 will not pivot due to the weight of the client device 102 when the client device 102 is supported on a surface by the support component 302, e.g., a kickstand. For instance, unless a user or other external entity applies external force to the support component 302, the hinge 114 will remain statically positioned in the position 500.

FIG. 16 further illustrates that in response to movement of the pivot member 1108 to the position 500, the support plate 1112 moves along with the pivot member 1108 and partially protrudes from the hinge frame 1102. Frictional interaction between the pivot member 1108 and the support plate 1112, for instance, causes the support plate 1112 to move such that when the pivot member 1108 is moved to an open position, the support plate 1112 moves along with the pivot member 1108. This is not intended to be limiting, however, and in some implementations the support plate 1112 does not move with the pivot member 1108 until a catch feature of the pivot member 1108 (discussed below) engages with the support plate 1112.

Figure 17:
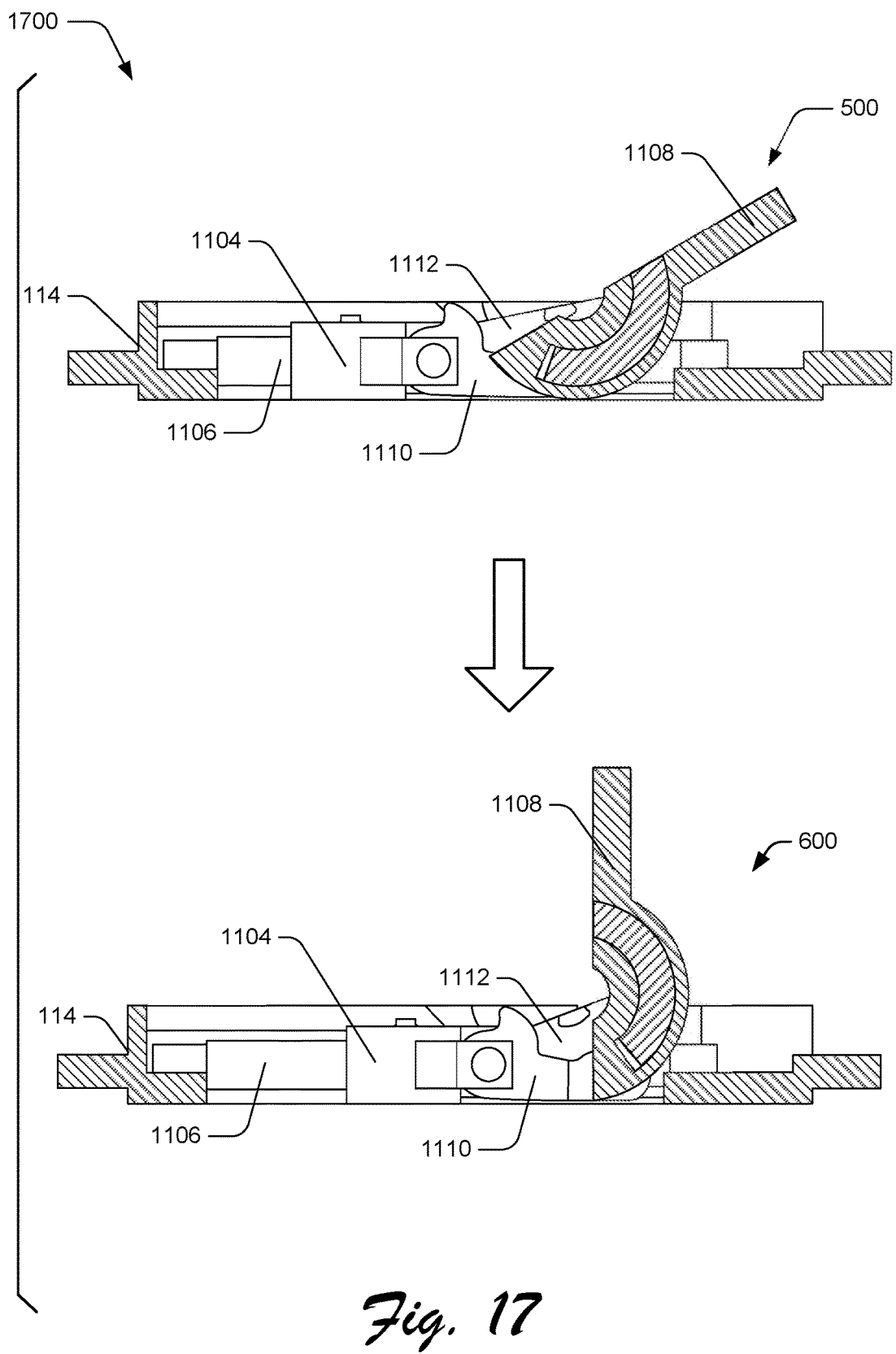
FIG. 17 depicts respective left side (with rear facing up) cutaway views in an implementation scenario for opening of an example hinge.

FIG. 17 depicts an implementation scenario 1700 for further opening of the hinge 114 in accordance with one or more implementations. The depictions of the hinge 114 in the scenario 1500 show a side cutaway view of the hinge 114. In at least some implementations, the scenario 1700 represents a continuation of the scenario 1500, described above.

In the scenario 1700, the hinge 114 is opened from position 500 to the position 600, introduced above with reference to FIGS. 6 and 16. As the pivot member 1108 pivots further open relative to the hinge frame, the support plate 1112 pivots along with the pivot member 1108.

During movement of the hinge 114 in the scenario 1700, the engagement member 1104 may slide along the elongated member 1106 from the second portion 1109 to the first portion 1107. The first portion 1107 is ramped such that the torque output of the hinge 114 gradually increases as the engagement member 1104 slides into and/or through the first portion 1107. This increase in torque output is generally caused due to an increase in slope or diameter along the first portion 1107 of the elongated member 1106.

Figure 18:
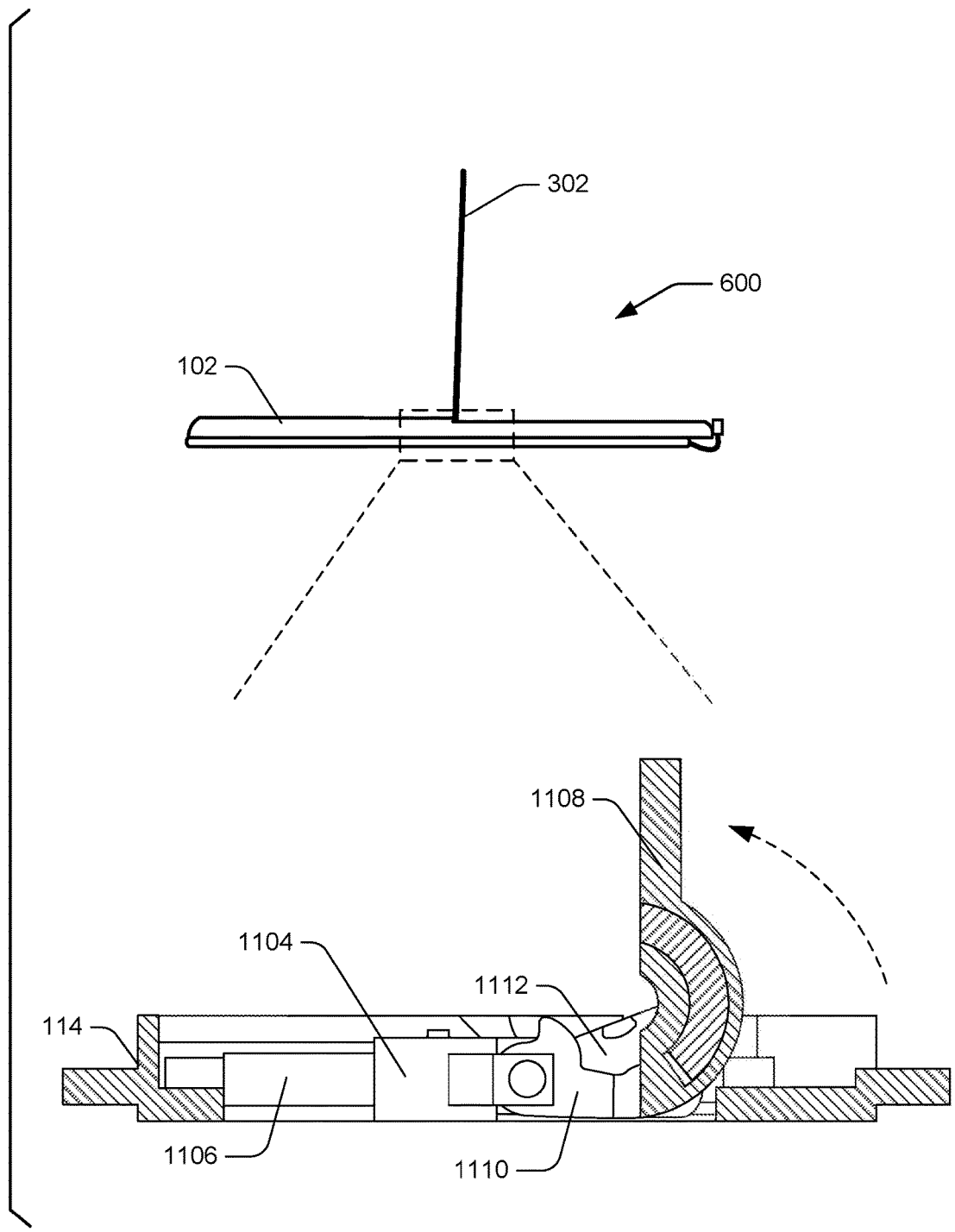
FIG. 18 depicts a left side (with rear facing up) cutaway view of an example hinge and a corresponding open position of a support component of a computing device.

FIG. 18 depicts a side cutaway view of the hinge 114 opened to the position 600 in accordance with one or more implementations. For instance, a user manipulates the support component 302 from the open position 500 to the position 600 relative to the client device 102, such as introduced with reference to FIGS. 6 and 17. According to various implementations, the torque response of the hinge 114 at position 600 is such that absent externally applied force, the hinge 114 relative to an attached component such as client device 102 will not pivot due to the weight of the client device 102 when the client device 102 is supported on a surface by the support component 302, e.g., a kickstand. For instance, unless a user or other external entity applies external force to the support component 302, the hinge 114 will remain statically positioned in the position 600.

Figure 19:
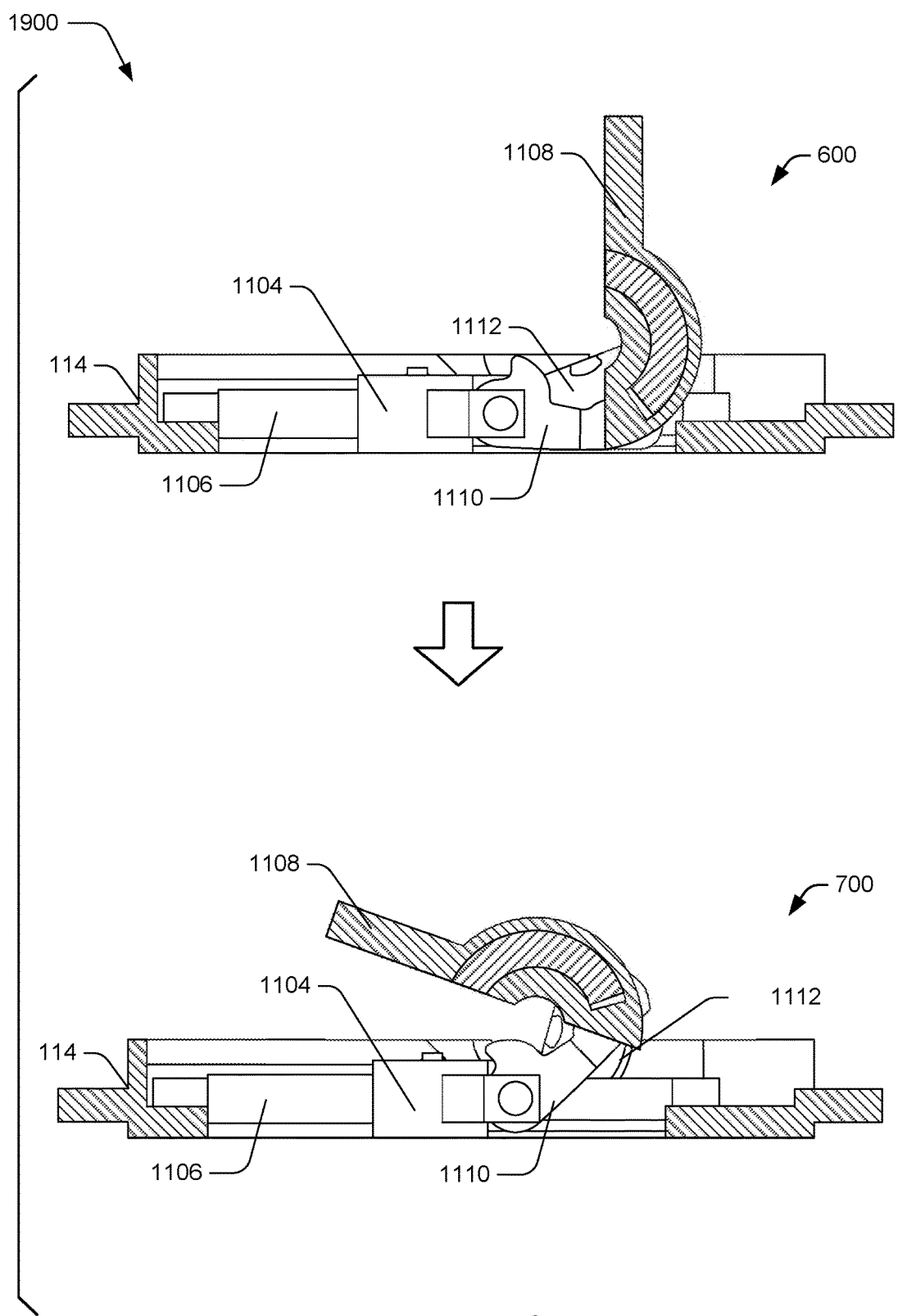
FIG. 19 depicts respective left side (with rear facing up) cutaway views in an implementation scenario for opening of an example hinge.

FIG. 19 depicts an implementation scenario 1900 for further opening of the hinge 114 in accordance with one or more implementations. The depictions of the hinge 114 in the scenario 1900 show a side cutaway view of the hinge 114. In at least some implementations, the scenario 1900 represents a continuation of the scenarios 1500 and 1700 described above.

In the scenario 1900, the hinge 114 is opened further past the position 600 to the position 700. In moving to this position, engagement member 1104 slides along the elongated member 1106 through the first portion 1107. As the hinge 114 opens further to the position 700 in the lower portion of the scenario 1900, the amount of friction between the engagement member 1104 and the elongated member 1106 increases due to increasing engagement force caused by the increasing diameter along the first portion 1107 of elongated member 1106. Accordingly, as the engagement member 1104 slides further along the first portion 1107 of the elongated member 1106, the slope or diameter of the shaft increases, the engagement force increases, and so the amount of friction increases. This amount of sliding friction contributes to the torque output of the hinge 114 as the hinge moves to the position 700.

Figure 20:
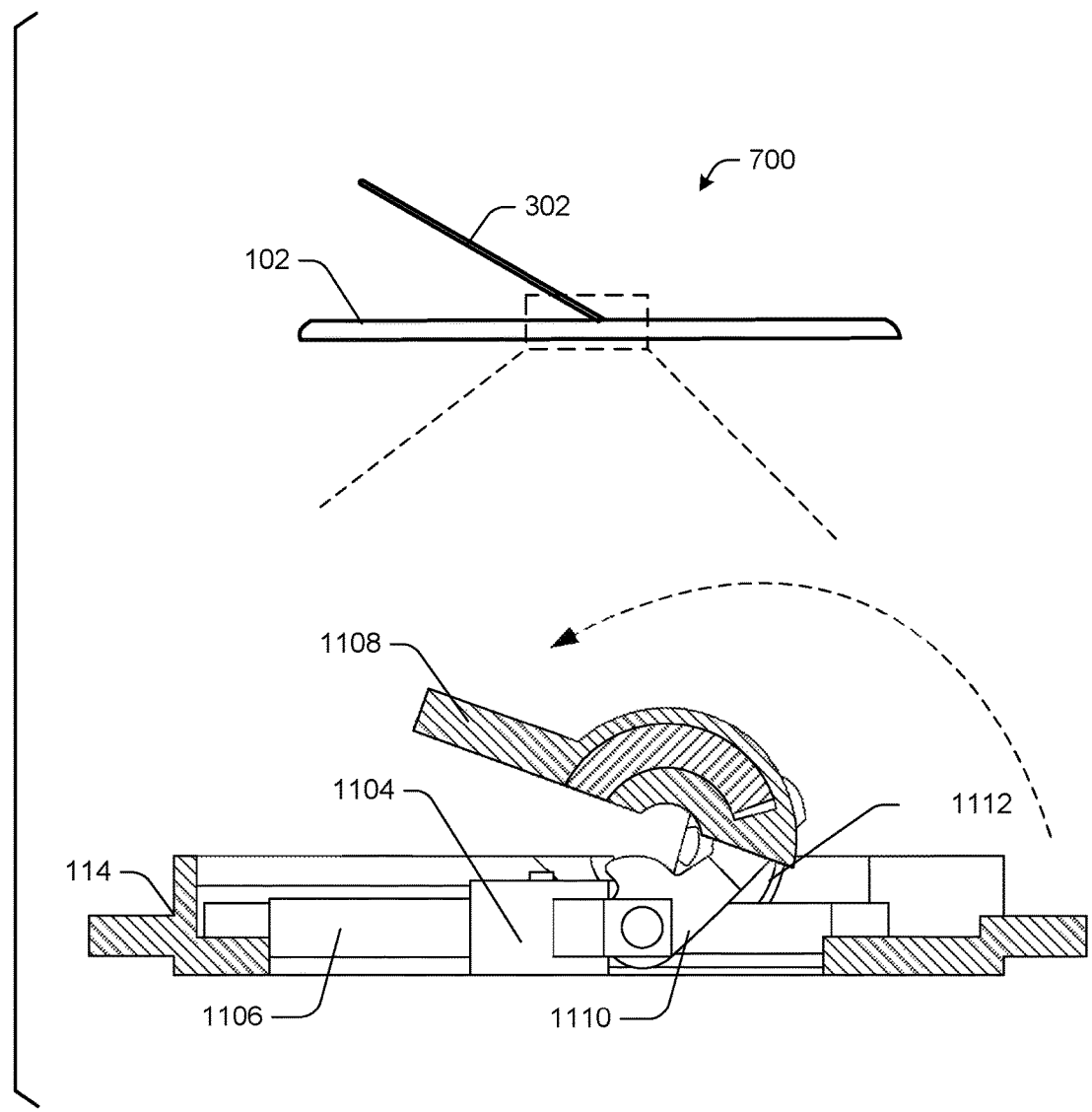
FIG. 20 depicts a left side (with rear facing up) cutaway view of an example hinge and a corresponding open position of a support component of a computing device.

FIG. 20 depicts a side cutaway view of the hinge 114 opened to the position 700 in accordance with one or more implementations. For instance, a user manipulates the support component 302 from the open position 600 to the position 700 introduced with reference to FIGS. 7 and 19. According to various implementations, the torque response of the hinge 114 at position 700 is such that absent externally applied force, the hinge 114 relative to an attached component such as client device 102 will not pivot due to the weight of the client device 102 when the client device 102 is supported on a surface by the support component 302, e.g., a kickstand. For instance, unless a user or other external entity applies external force to the support component 302, the hinge 114 will remain statically positioned in the position 700.

Figure 21:
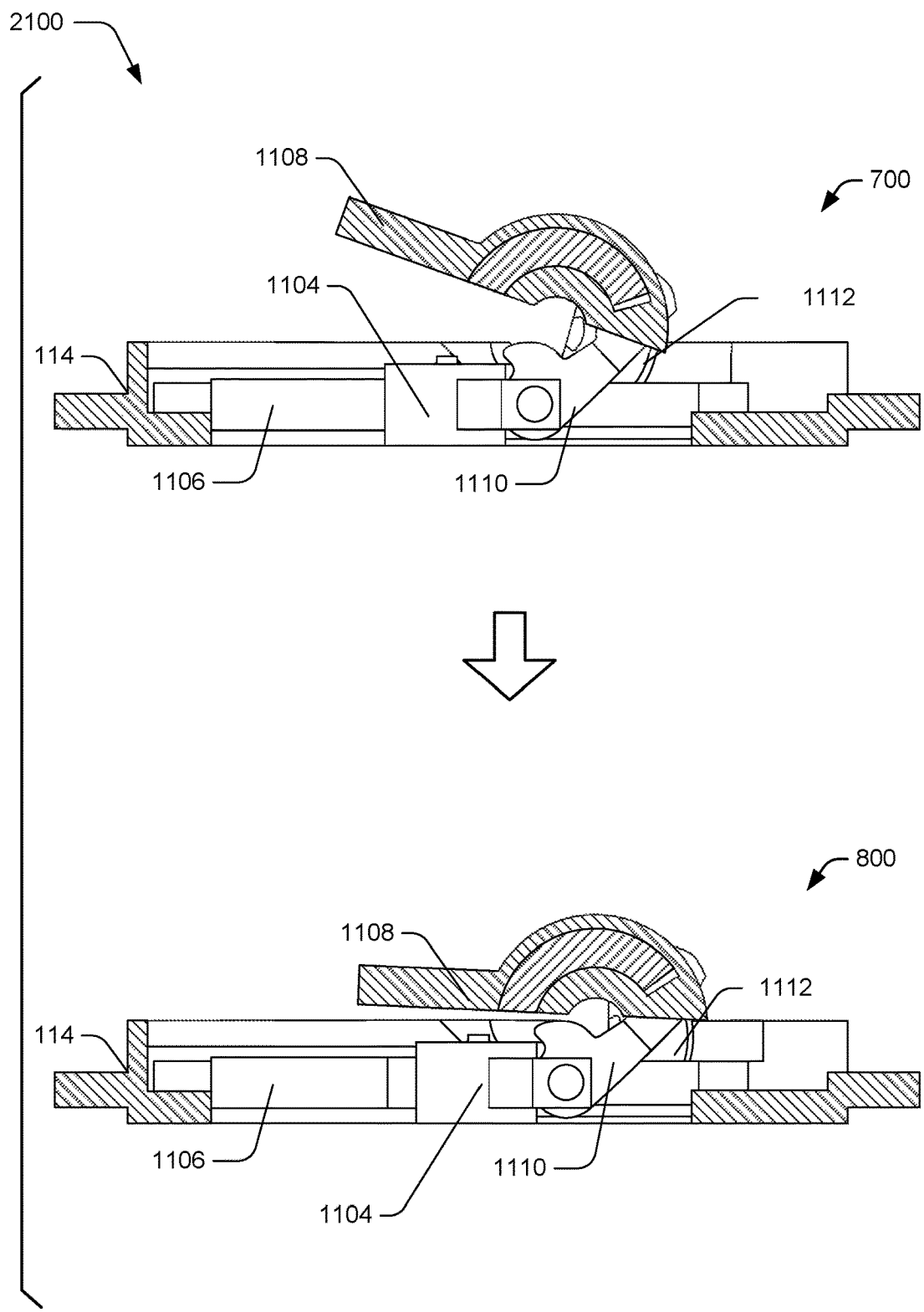
FIG. 21 depicts respective left side (with rear facing up) cutaway views in an implementation scenario for opening of an example hinge.

FIG. 21 depicts an implementation scenario 2100 for further opening of the hinge 114 in accordance with one or more implementations. The depictions of the hinge 114 in the scenario 2100 show a side cutaway view of the hinge 114. In at least some implementations, the scenario 2100 represents a continuation of the scenarios 1500, 1700, and 1900 described above.

In the scenario 2100, the hinge 114 is opened further past the position 700 to the position 800. In moving to the position 800, the engagement member 1104 reaches a limiting structure or wall at the end of the elongated member 1106. For instance, the limiting structure or wall may be located at the end of the first portion 1107 of the elongated member 1106. Accordingly, the slope or shaft of the elongated member 1106 has an increasing diameter along the first portion 1107 of elongated member 1106, and so the amount of friction increases as the engagement member 1104 slides to the end of the first portion 1107 until linear movement is stopped by the limiting structure or wall. This amount of sliding friction contributes to the torque output of the hinge 114 as the hinge moves to the position 800.

In at least some implementations, the position 800 represents a maximum open position for the support component 302. For instance, the position 800 is a hard stop position for the pivot member 1108 such that the pivot member 1108 will not pivot further open relative to the hinge frame 1102.

Figure 22:
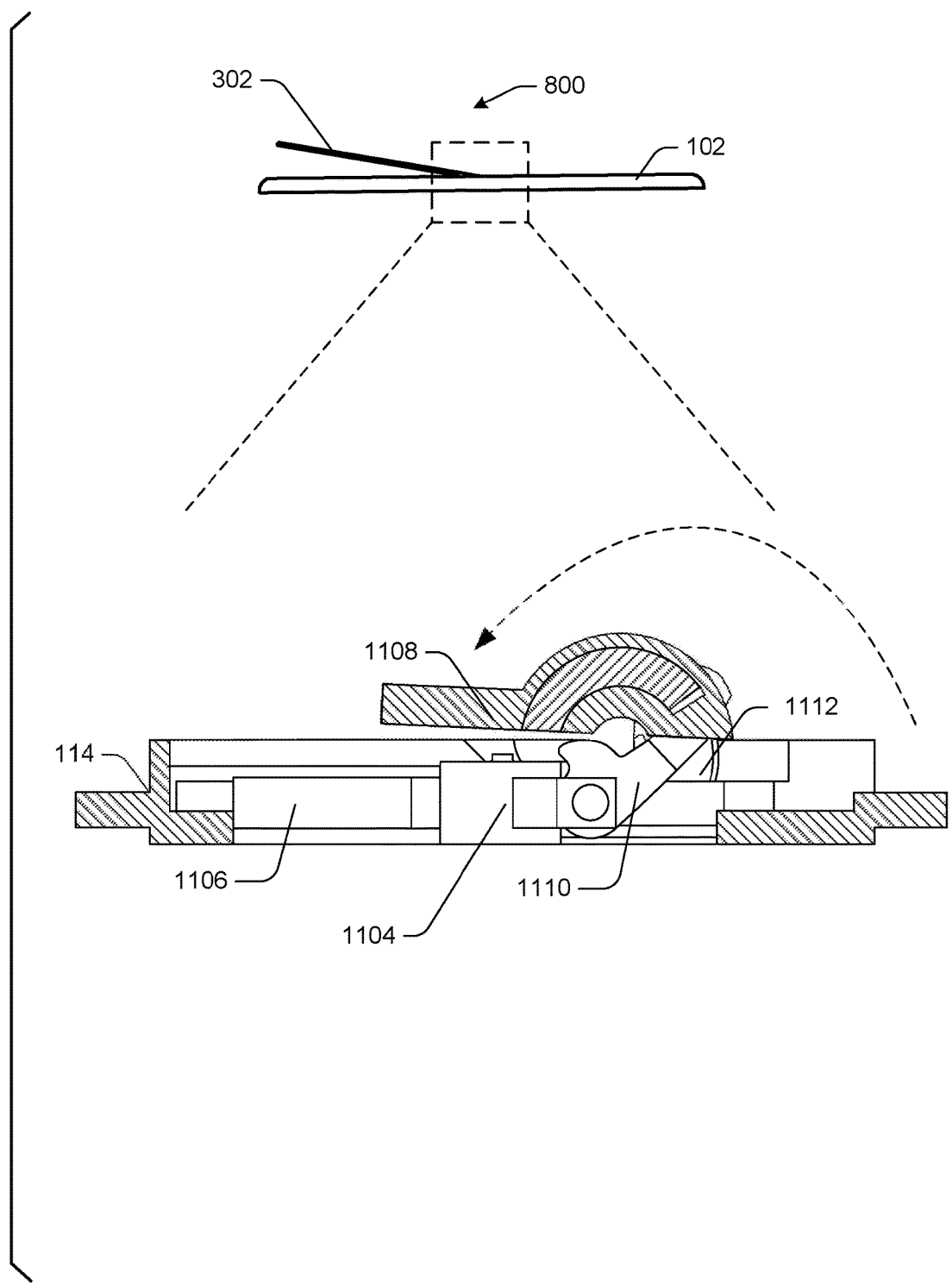
FIG. 22 depicts a left side (with rear facing up) cutaway view of an example hinge and a corresponding open position of a support component of a computing device.

FIG. 22 depicts a side cutaway view of the hinge 114 opened to the position 800 in accordance with one or more implementations. For instance, a user manipulates the support component 302 from the open position 700 to the position 800 introduced with reference to FIGS. 8 and 21. In at least some implementations, the position 800 represents a maximum opening position for the hinge 114.

FIG. 22 further illustrates that in the position 800, the pivot member 1108 is fully removed from within the hinge frame 1102. The pivot member 1108, however, remains engaged with the support plate 1112 and the support plate 1112 remains engaged with the hinge frame 1102. Accordingly, in the position 800, the support plate 1112 connects the pivot member 1108 to the hinge frame 1102, and thus enables the hinge 114 to remain as an interconnected and integrated hinge mechanism even when the pivot member 1108 is fully removed from within the hinge frame 1102.

Figure 23:
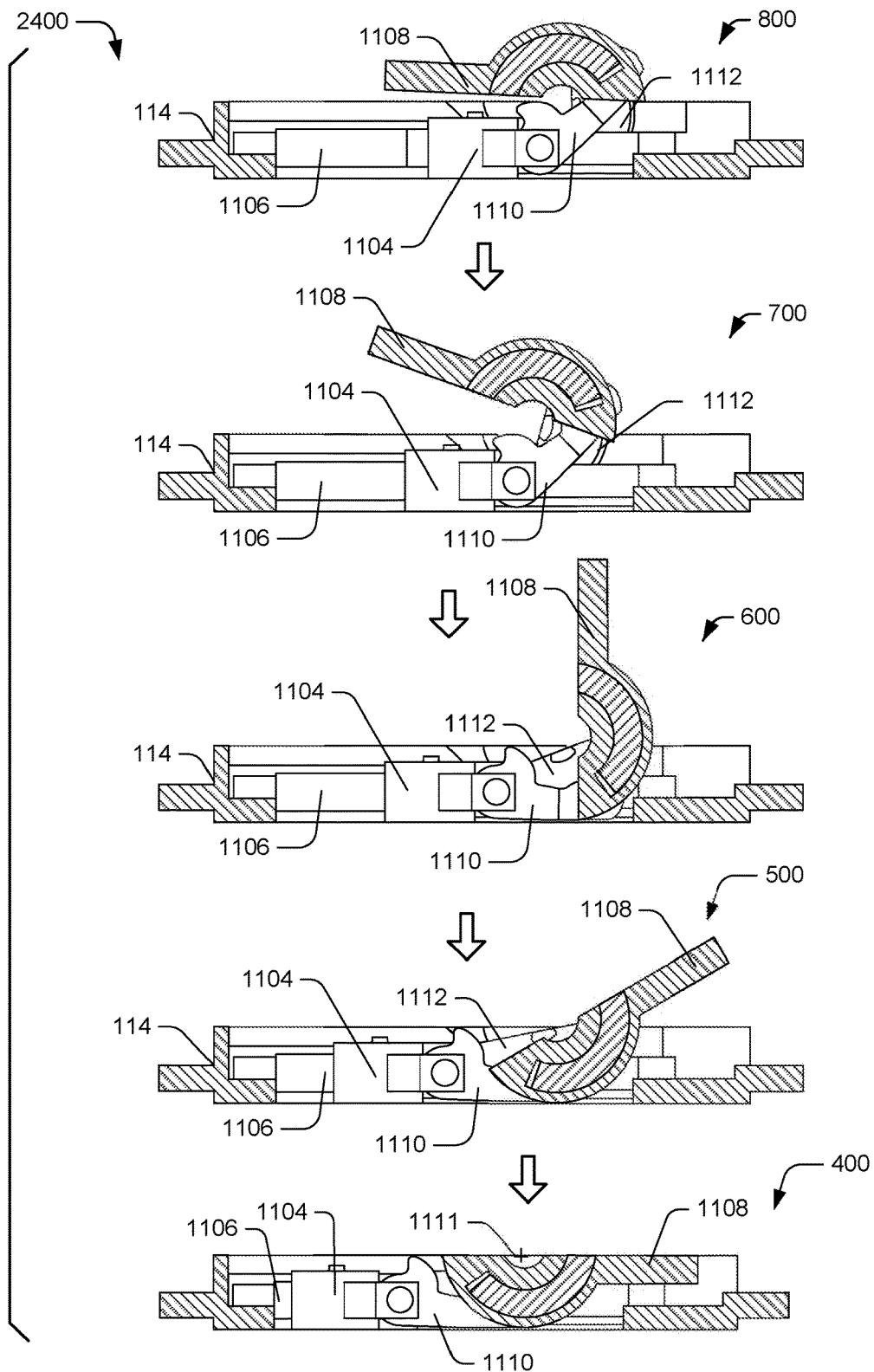
FIG. 23 depicts respective left side (with rear facing up) cutaway views in an example implementation scenario for closing an example hinge.

FIG. 23 depicts an example scenario 2400 for closing the hinge 114 in accordance with one or more implementations. The scenario 2400, for instance, represents a scenario where the support component 302 is closed from a fully open position to a fully closed position. The upper portion of the scenario 2400 shows the hinge 114 being moved in a closing direction from the position 800 to the position 700. For instance, a user manipulates the support component 302 from the position 800 to the position 700. As the hinge 114 moves from the position 800 to the position 700, the engagement member 1104 slides along the first portion 1107 of the elongated member 1106 in the direction of the second portion 1109 of the elongated member 1106. As detailed above, the slope factor of the surface or diameter of the shaft of elongated member 1106 determines an amount of sliding friction, which may vary, and that contributes to the torque output of the hinge 114 as the hinge 114 moves from the position 800 to the position 700.

Continuing through the scenario 2400, the hinge 114 moves to the position 600 and then to the position 500, and then to position 400, i.e., a fully closed position. A user, for instance, manipulates the support component 302 to a closed position relative to the client device 102. Notice that as the hinge 114 closes, the plate catch 2102 engages with the support plate 1112 such that the pivot member 1108 pulls the support plate 1112 and the support plate 1112 moves along with the pivot member 1108 to the closed position 400.

As illustrated in the lower portion of the scenario 2400, moving the hinge 114 from position 800 to the position 400 causes the engagement member 1104 to slide from the first portion 1107 of the elongated member 1106 to the second portion 1109 of the elongated member 1106. Thus, the engagement member 1104 remains engaged within the elongated member 1106 during movement of the hinge 114 between various open positions, and back to a closed position, and the sliding friction varies during at least a portion of the movement, e.g., at least along the sloped first portion 1107 of elongated member 1106.

Having discussed some example support component and hinge positions, consider now a discussion of an example responsiveness profile associated with movement between the different hinge positions.

Considering the different positions of the hinge 114 or 114' and the support component 302 discussed above, a torque response profile (i.e., the "torque output") experienced during movement of the support component 302 between the different positions is determined based on an amount of change in surface height over longitudinal distance of the ramped surface which causes variations in a sliding friction of the engagement member 1104 sliding along the ramped surface of the elongated member 1106. Thus, varying the angle of the ramped surface relative to a longitudinal direction of elongated member 1106, or a linear direction of movement of engagement member 1104, allows for fine-tuning of the torque output of the hinge 114 by contributing to variations in an amount of sliding friction of the engagement member 1104 relative to the elongated member 1106.

In at least some examples, the torque output of the hinge 114 can be characterized via torque profiles that indicate various forces that occur during movement of the support component 302 between various positions. Consider, for example, the following example torque profiles.

Figure 24:
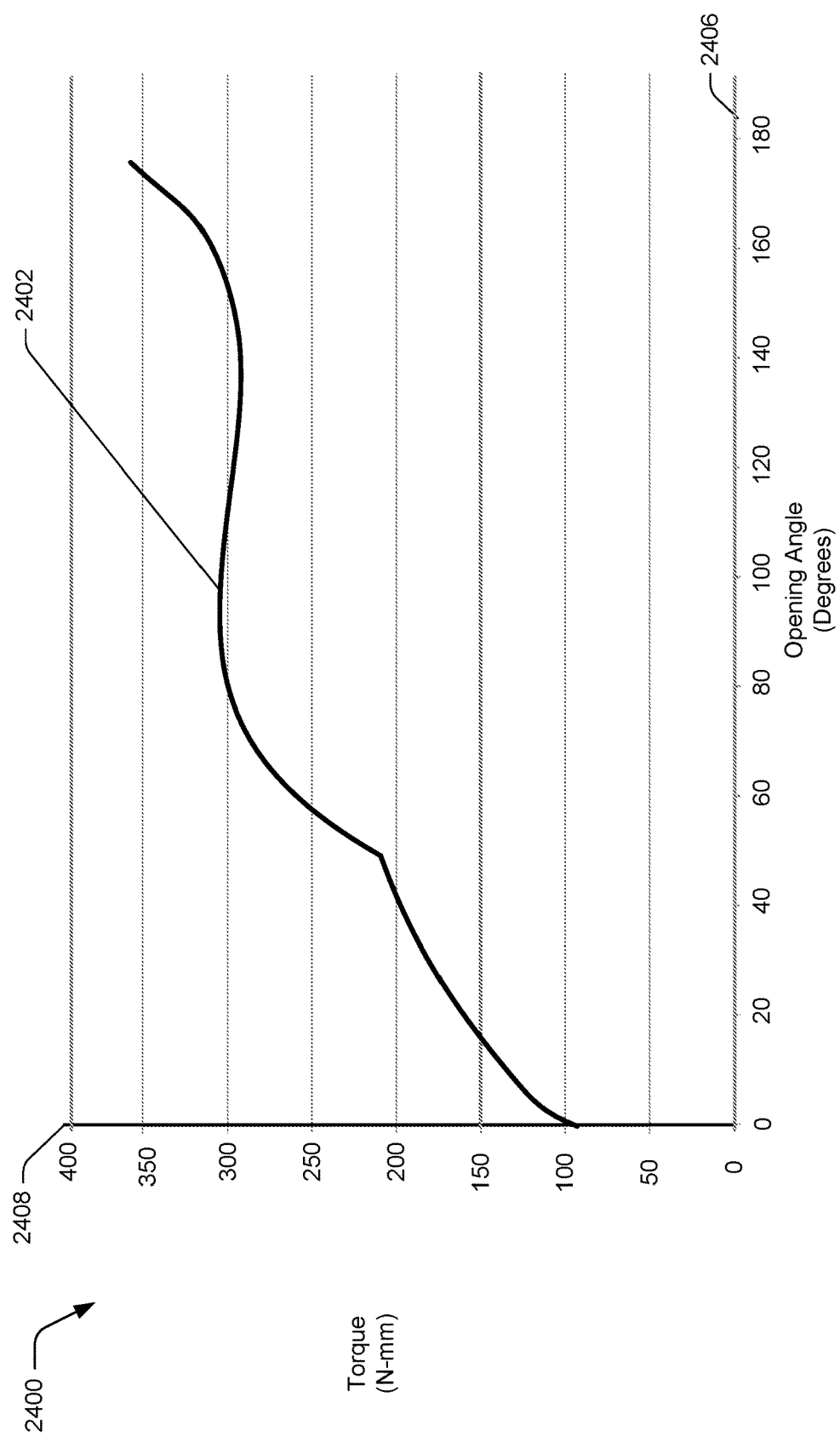
FIG. 24 illustrates an opening torque graph for an example hinge.

FIG. 24, illustrates a torque graph 2400, including an angle axis 2406 and a torque axis 2408, that includes a torque curve 2402 that defines torque provide by hinge 114 or 114' during opening of hinge 114 or 114' from a closed position (e.g., angle "0") to a maximum open position (e.g., angle "180"). For example, the angle axis 2406 (e.g., the x-axis) indicates opening angle values for pivot member 1108 relative to hinge frame 1102, and hence the support component 302 relative to an associated apparatus, e.g., the client device 102. The torque axis 2408 (e.g., the y-axis) indicates different torque values for the torque graph 2400. In this example, the torque values are indicated in Newton-millimeters (N-mm). This unit measure is not to be interpreted as limiting, however, and torque values may be measured in a variety of different units. Further, different forces may be measured to characterize the movement of the hinge 114 and/or the support component 302.

According to one or more implementations, the opening torque curve 2402 represents torque supplied by hinge 114 via pivot member 1108 to the support component 302 when the support component is opened (e.g., via user manipulation) from a closed position to various open positions. The interaction between the engagement member 1104 and the elongated member 1106 may be designed to contribute to and/or achieve the torque values at the various positions on torque graph 2400. For instance, when dealing with a nearly circular band around a circular shaft, hinge 114 or 114' may be configured so that the shaft diameter varies along its length to increase the engagement force and hence the sliding friction between the engagement member 1104 and elongated member 1106 at one or more positions.

Figure 25:
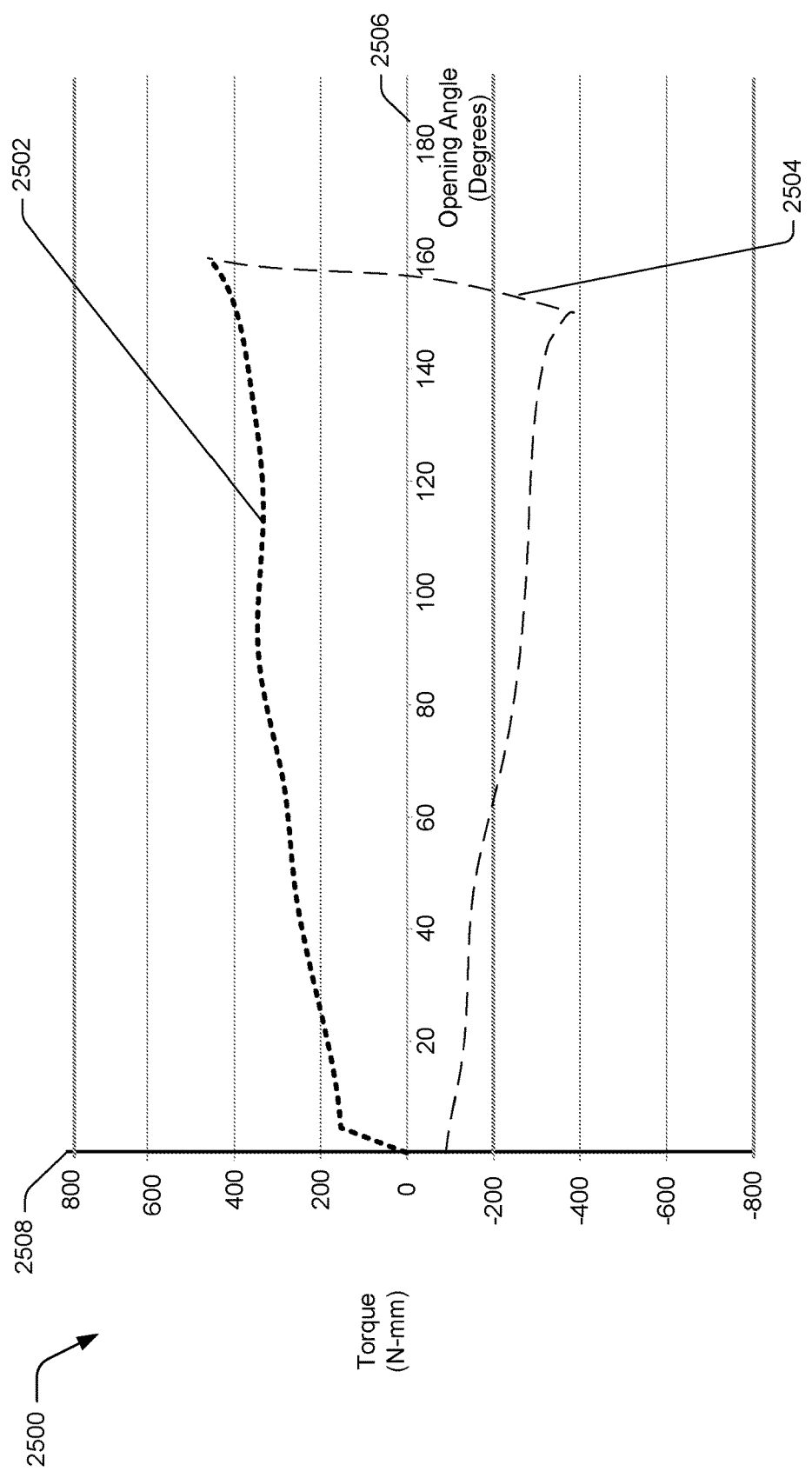
FIG. 25 illustrates an opening and closing torque graph for an example hinge.

FIG. 25 illustrates a torque graph 2500, including an angle axis 2506 and a torque axis 2508, that includes a hinge-opening torque curve 2502 and a hinge-closing torque curve 2504. The angle axis 2506 (e.g., the x-axis) indicates opening and closing angle values for pivot member 1108 relative to hinge frame 1102, and hence the support component 302 relative to an associated apparatus, e.g., the client device 102. The torque axis 2508 (e.g., the y-axis) indicates different torque values for the torque graph 2500. In this example, the torque values are indicated in Newton-millimeters (N-mm). This unit measure is not to be interpreted as limiting, however, and torque values may be measured in a variety of different units. Further, different forces may be measured to characterize the movement of the hinge 114 and/or the support component 302.

According to one or more implementations, the opening torque curve 2502 represents torque supplied from hinge 114 or 114' via pivot member 1108 to the support component 302 when the support component 302 is opened (e.g., via user manipulation) from a closed position to various open positions. The closing torque curve 2504 represents torque supplied from hinge 114 or 114' via pivot member 1108 to the support component 302 when the support component 302 is moved (e.g., via user manipulation) from various open positions towards a closed position.

Generally, the different torque curves are associated with certain "action points" or "action regions" that demonstrate the overall responsiveness profile of the hinge mechanism discussed herein. The torque forces represented at different portions of the torque curves, for example, correspond to the interaction between the engagement member and the elongated member discussed above. The interaction between the engagement member 1104 and the elongated member 1106 may be designed to contribute to and/or achieve the torque values at the various positions on torque graph 2500. For instance, when dealing with a nearly circular band around a circular shaft, hinge 114 or 114' may be configured so that the shaft diameter varies along its length to increase the engagement force and hence the sliding friction between the engagement member 1104 and elongated member 1106 at one or more positions.

According to various implementations, if a user manipulates the support component 302 to any position represented along the torque curves 2502 and 2504 and releases the support component 302, the hinge 114 and thus the support component 302 will remain in the released position absent external force to move the support component 302 from that position. For instance, resistance to rotation of the hinge 114 or 114' in response to friction between engagement member 1104 and elongated member 1106 enables the hinge 114 or 114', and thus an attached component such as client device 102 and the support component 302 such as a kickstand, to persist in various open positions under the weight of the client device 102 to support a variety of different usage scenarios.

Accordingly, implementations discussed herein provide a hinge mechanism that enables an attached component (e.g., a support component) to be adjusted between multiple positions. It is to be appreciated that the example device orientations, support component positions, hinge positions, component scale, torque values, and so forth discussed above are presented for purposes of example only. Thus, a wide variety of different device orientations, support component positions, hinge positions, and torque values not specifically mentioned herein may be implemented within the spirit and scope of the claimed implementations.

Figure 26:
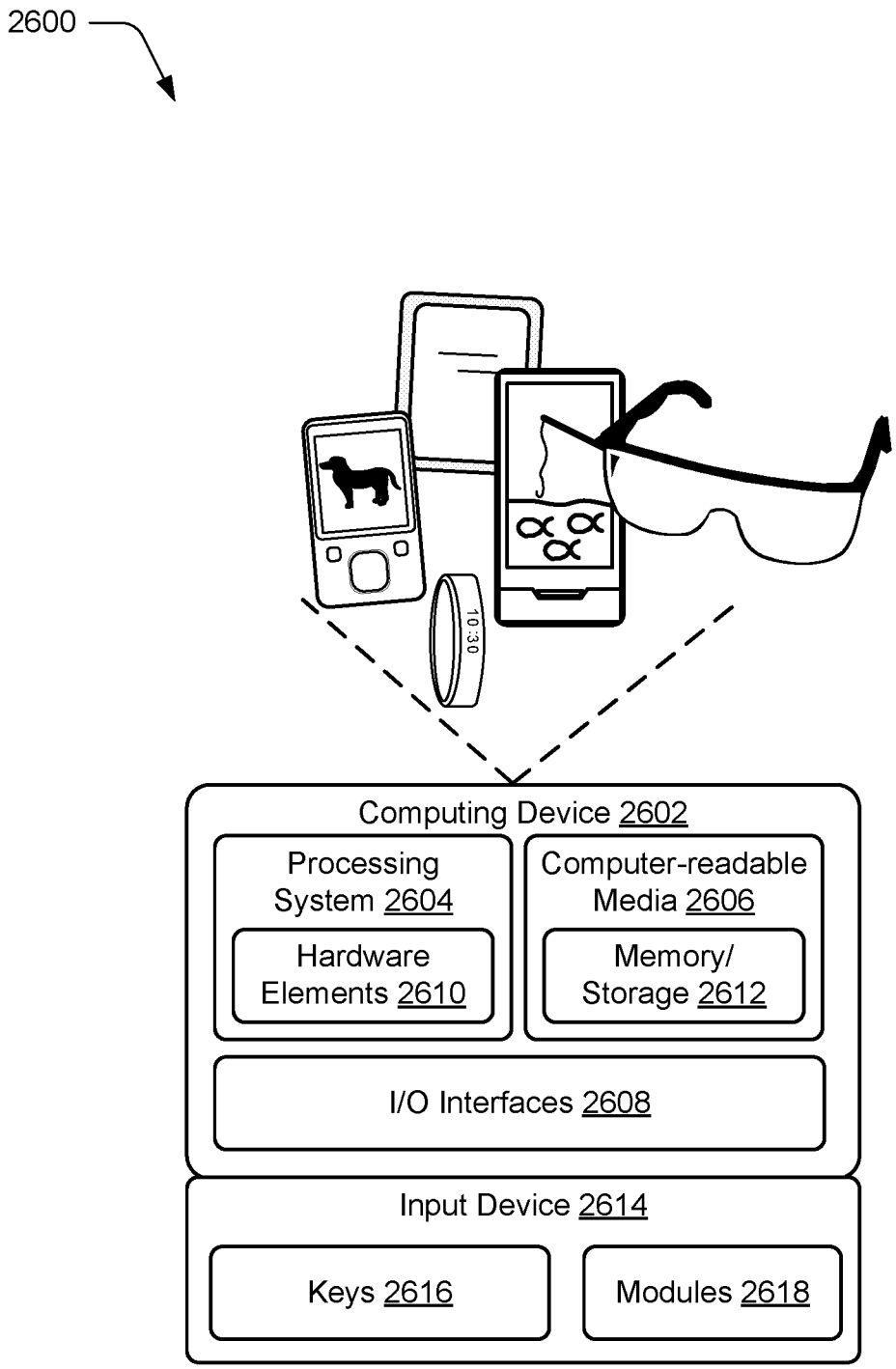
FIG. 26 illustrates an example system including various components of an example device that can be implemented as any type of computing device as described with reference to FIGS. 1-25 to implement examples of the techniques described herein.

FIG. 26 illustrates an example system generally at 2600 that includes an example computing device 2602 that is representative of one or more computing systems and/or devices that may utilize one or more hinges 114 or 114' described herein. In at least some implementations, the computing device 2602 represents an implementation of the client device 102 discussed above. The computing device 2602 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the client device 102 may be implemented as a wearable device, such as a smart watch, smart glasses, and so forth.

The example computing device 2602 as illustrated includes a processing system 2604, one or more computer-readable media 2606, and one or more I/O interface 2608 that are communicatively coupled, one to another. Although not shown, the computing device 2602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2604 is representative of functionality to perform one or more operations using hardware. Accordingly, the processing system 2604 is illustrated as including hardware element 2610 that may be configured as processors, functional blocks, and so forth. This may include implementation in hardware as an application specific integrated circuit or other logic device formed using one or more semiconductors. The hardware elements 2610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2606 is illustrated as including memory/storage 2612. The memory/storage 2612 represents memory/storage capacity associated with one or more computer-readable media. The memory/storage component 2612 may include volatile media (such as random access memory (RAM)) and/or nonvolatile media (such as read only memory (ROM), Flash memory, optical disks, magnetic disks, and so forth). The memory/storage component 2612 may include fixed media (e.g., RAM, ROM, a fixed hard drive, and so on) as well as removable media (e.g., Flash memory, a removable hard drive, an optical disc, and so forth). The computer-readable media 2606 may be configured in a variety of other ways as further described below.

Input/output interface(s) 2608 are representative of functionality to allow a user to enter commands and information to computing device 2602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2602 may be configured in a variety of ways to support user interaction.

The computing device 2602 is further illustrated as being communicatively and physically coupled to an input device 2614 that is physically and communicatively removable from the computing device 2602. In this way, a variety of different input devices may be coupled to the computing device 2602 having a wide variety of configurations to support a wide variety of functionality. In this example, the input device 2614 includes one or more keys 2616, which may be configured as pressure sensitive keys, mechanically switched keys, and so forth.

The input device 2614 is further illustrated as include one or more modules 2618 that may be configured to support a variety of functionality. The one or more modules 2618, for instance, may be configured to process analog and/or digital signals received from the keys 2616 to determine whether a keystroke was intended, determine whether an input is indicative of resting pressure, support authentication of the input device 2614 for operation with the computing device 2602, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2610 and computer-readable media 2606 are representative of modules, programmable device logic and/or fixed device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2610. The computing device 2602 may be configured to implement particular instructions and/or functions corresponding to the software and/or hardware modules. Accordingly, implementation of a module that is executable by the computing device 2602 as software may be achieved at least partially in hardware, e.g., through use of computer-readable storage media and/or hardware elements 2610 of the processing system 2604. The instructions and/or functions may be executable/operable by one or more articles of manufacture (for example, one or more computing devices 2602 and/or processing systems 2604) to implement techniques, modules, and examples described herein.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

Implementations discussed herein include:

Example 1

A device, comprising: a support component movably attached to the device, the support component configured to physically support the component in one or more positions relative to an adjacent surface; and at least one hinge that moveably attaches a portion of the support component to the device, each hinge including: a hinge frame; a pivot member pivotably engaged with the hinge frame, the pivot member being attached to the support component; an elongated member attached to the hinge frame, the elongated member having a ramped surface on at least a first portion of the elongated member; and an engagement member slidably engaged with the elongated member, the engagement member configured to slide along the elongated member during pivoting of the pivot member relative to the hinge frame, the sliding of the engagement member along the ramped surface of the elongated member causing variations in a sliding friction based on an amount of change in surface height over longitudinal distance of the ramped surface and contributing to a torque profile of the hinge.

Example 2

A device as described in example 1, wherein the engagement member has a first engagement force at first position along the ramped surface of the elongated member and a second engagement force at a second position along the ramped surface of the elongated member, wherein the second engagement force is different from the first engagement force.

Example 3

A device as described in one or more of examples 1 or 2, wherein moving the support component from a closed position relative to the device to a first open position relative to the device causes opening of the hinge such that the engagement member slides along a second portion of the elongated member having a substantially constant sliding friction, wherein moving the support component from the first open position relative to the device to the closed position relative to the device causes closing of the hinge such that the engagement member slides along the second portion of the elongated member.

Example 4

A device as described in one or more of examples 1-3, wherein moving the support component from a first open position relative to the device to a second open position relative to the device causes further opening of the hinge such that the engagement member slides along the elongated member from a second portion of the elongated member to the first portion of the elongated member, wherein the engagement member sliding from the second portion of the elongated member to the first portion of the elongated member increases the sliding friction, wherein the engagement member sliding along the first portion of the elongated member increases the sliding friction.

Example 5

A device as described in one or more of examples 1-4, wherein moving the support component from a second open position relative to the device to a first open position relative to the device causes closing of the hinge such that the engagement member slides along the elongated member from the first portion of the elongated member to a second portion of the elongated member, wherein the engagement member sliding along the first portion of the elongated member decreases the sliding friction, wherein the engagement member sliding from the first portion of the elongated member to the second portion of the elongated member decreases the sliding friction.

Example 6

A device as described one or more of examples 1-5, wherein the elongated member is fixedly attached to the hinge frame and comprises a shaft having an increasing diameter along the first portion of elongated member.

Example 7

A device as described in one or more of examples 1-6, wherein the engagement member comprises a base portion and at least one extending member elastically deformable relative to the base portion in response to movement of the engagement member along the first portion of the elongated member.

Example 8

A device as described in one or more of examples 1-7, wherein the elongated member comprises a shaft having an increasing diameter along the first portion of elongated member, and wherein the engagement member comprises a base portion and at least one extending member extending from the base portion, wherein the at least one extending member includes opposing walls that slidably engage the shaft, wherein the opposing walls are elastically deformable in response to movement of the at least one extending member along the first portion of the shaft.

Example 9

A device as described in one or more of examples 1-8, wherein each hinge further includes one or more linkage members having a first end and second end, the first end rotatably connected with the engagement member and the second end rotatably connected with the pivot member.

Example 10

A device as described in one or more of examples 1-9, wherein the first end of the one or more linkage members is rotatably connected between the engagement member and the elongated member.

Example 11

A device as described in one or more of examples 1-10, wherein each hinge further includes: one or more support plates slidably engaged with one or more support guides on an interior surface of the hinge frame, the pivot member slidably engaged with the one or more support plates such that the pivot member is rotatable from within the hinge frame to a position outside of the hinge frame while remaining engaged with the one or more support plates.

Example 12

A device as described in one or more of examples 1-11, wherein the hinge further includes a guiding component 1114 fixedly attached to the hinge frame, and a linkage member rotatably attached to the engagement member and rotatably attached to the one or more support plates, wherein the engagement member slidingly engages the guiding component 1114 when the engagement member slidably engages with the elongated member.

Example 13

A device as described in one or more of examples 1-12, wherein the support component is configured to support different orientations of the device relative to an adjacent surface.

Example 14

A hinge, comprising: a hinge frame; a pivot member pivotably engaged with the hinge frame, the pivot member being attached to a support component movably attached to a device; an elongated member attached to the to hinge frame, the elongated member having a ramped surface on at least a first portion of the elongated member; and an engagement member slidably engaged with the elongated member, the engagement member configured to slide along the elongated member during pivoting of the pivot member relative to the hinge frame, the sliding of the engagement member along the taped surface of the elongated member causing variations in a sliding friction based on an amount of change in surface height over longitudinal distance of the ramped surface and contributing to a torque profile of the hinge.

Example 15

A hinge as described in example 14, wherein moving the support component from a closed position relative to the device to a first open position relative to the device causes opening of the hinge such that the engagement member slides along a second portion of the elongated member having a substantially constant sliding friction, wherein moving the support component from the first open position relative to the device to the closed position relative to the device causes closing of the hinge such that the engagement member slides along the second portion of the elongated member.

Example 16

A hinge as described in one or more of examples 14 or 15, wherein the elongated member is fixedly attached to the hinge frame and comprises a shaft having an increasing diameter along the first portion of elongated member.

Example 17

A hinge as described in one or more of examples 14-16, wherein the engagement member comprises a base portion and at least one extending member elastically deformable relative to the base portion in response to movement of the engagement member along the first portion of the elongated member.

Example 18

A hinge as described in one or more of examples 14-17, wherein the elongated member comprises a shaft having an increasing diameter along the first portion of elongated member, and wherein the engagement member comprises a base portion and at least one extending member extending from the base portion, wherein the at least one extending member includes opposing walls that slidably engage the shaft, wherein the opposing walls are elastically deformable in response to movement of the at least one extending member along the first portion of the shaft.

Example 19

A hinge as described in one or more of examples 14-18, wherein each hinge further includes one or more linkage members having a first end and second end, the first end rotatably connected with the engagement member and the second end rotatably connected with the pivot member.

Example 20

An apparatus, comprising: a chassis; a support component movably attached to the chassis, the support component being configured to physically support the component in one or more positions relative to an adjacent surface; and at least one hinge that moveably attaches a portion of the support component to the chassis, each hinge including: a hinge frame; a pivot member pivotably engaged with the hinge frame, the pivot member being attached to the support component; an elongated member attached to the to hinge frame, the elongated member having a ramped surface on at least a first portion of the elongated member; and an engagement member slidably engaged with the elongated member within the hinge frame, the engagement member configured to slide along the elongated member during pivoting of the pivot member relative to the hinge frame, the sliding of the engagement member along the ramped surface of the elongated member causing variations in a sliding friction based on an amount of change in surface height over longitudinal distance of the ramped surface and contributing to a torque profile of the hinge.

What is claimed is:
1. A device, comprising:
    a support component movably attached to the device, the support component configured to physically support the component in one or more positions relative to an adjacent surface; and
    at least one hinge that moveably attaches a portion of the support component to the device, each hinge including:
        a hinge frame;
        a pivot member pivotably engaged with the hinge frame, the pivot member being attached to the support component;
        an elongated member attached to the hinge frame, the elongated member having a ramped surface on at least a first portion of the elongated member;
        an engagement member slidably engaged with the elongated member, the engagement member configured to slide along the elongated member during pivoting of the pivot member relative to the hinge frame, the sliding of the engagement member along the ramped surface of the elongated member causing variations in a sliding friction based on an amount of change in surface height over longitudinal distance of the ramped surface and contributing to a torque profile of the hinge; and
        one or more linkage members having a first end and second end, the first end rotatably connected with the engagement member and the second end rotatably connected with the pivot member, the one or more linkage members configured to engage the pivot member and the engagement member causing linear movement of the engagement member to slide along the elongated member during pivoting of the pivot member relative to the hinge frame, and wherein the first end of the one or more linkage members is rotatably connected between an interior of a mounting flange of the engagement member and the elongated member.

2. The device of claim 1, wherein the engagement member experiences a first engagement force at first position along the ramped surface of the elongated member and a second engagement force at a second position along the ramped surface of the elongated member, wherein the second engagement force is different from the first engagement force.

3. The device of claim 1, wherein moving the support component from a closed position relative to the device to a first open position relative to the device causes opening of the hinge such that the engagement member slides along a second portion of the elongated member having a substantially constant sliding friction, wherein moving the support component from the first open position relative to the device to the closed position relative to the device causes closing of the hinge such that the engagement member slides along the second portion of the elongated member.

4. The device of claim 1, wherein moving the support component from a first open position relative to the device to a second open position relative to the device causes further opening of the hinge such that the engagement member slides along the elongated member from a second portion of the elongated member to the first portion of the elongated member,
wherein the engagement member sliding from the second portion of the elongated member to the first portion of the elongated member increases the sliding friction,
wherein the engagement member sliding along the first portion of the elongated member, away from the second portion of the elongated member, increases the sliding friction.

5. The device of claim 1, wherein moving the support component from a second open position relative to the device to a first open position relative to the device causes closing of the hinge such that the engagement member slides along the elongated member from the first portion of the elongated member to a second portion of the elongated member,
wherein the engagement member sliding along the first portion of the elongated member, towards the second portion of the elongated member, decreases the sliding friction,
wherein the engagement member sliding from the first portion of the elongated member to the second portion of the elongated member decreases the sliding friction.

6. The device of claim 1, wherein the elongated member is fixedly attached to the hinge frame and comprises a shaft having an increasing diameter along the first portion of elongated member.

7. The device of claim 1, wherein the engagement member comprises a base portion and at least one extending member elastically deformable relative to the base portion in response to movement of the engagement member along the first portion of the elongated member.

8. The device of claim 1, wherein the elongated member comprises a shaft having an increasing diameter along the first portion of elongated member, and wherein the engagement member comprises a base portion and at least one extending member extending from the base portion, wherein the at least one extending member includes opposing walls that slidably engage the shaft, wherein the opposing walls are elastically deformable in response to movement of the at least one extending member along the first portion of the shaft.

9. The device of claim 1, wherein each hinge further includes:
one or more support plates slidably engaged with one or more support guides on an interior surface of the hinge frame, the pivot member slidably engaged with the one or more support plates such that the pivot member is rotatable from within the hinge frame to a position outside of the hinge frame while remaining engaged with the one or more support plates.

10. The device of claim 1, wherein the support component is configured to support different orientations of the device relative to an adjacent surface.

11. A device, comprising:
a support component movably attached to the device, the support component configured to physically support the component in one or more positions relative to an adjacent surface; and
at least one hinge that moveably attaches a portion of the support component to the device, each hinge including:
a hinge frame;
a pivot member pivotably engaged with the hinge frame, the pivot member being attached to the support component;
an elongated member attached to the hinge frame, the elongated member having a ramped surface on at least a first portion of the elongated member;
an engagement member slidably engaged with the elongated member, the engagement member configured to slide along the elongated member during pivoting of the pivot member relative to the hinge frame, the sliding of the engagement member along the ramped surface of the elongated member causing variations in a sliding friction based on an amount of change in surface height over longitudinal distance of the ramped surface and contributing to a torque profile of the hinge; and
a guiding component having side walls slidably attached to the hinge frame, and a linkage member rotatably attached to the engagement member and rotatably attached to the pivot member and retained by an interior surface of one of the side walls of the guiding component, the linkage member configured to engage the pivot member and the engagement member causing linear movement of the engagement member to slide along the elongated member during pivoting of the pivot member relative to the hinge frame.

12. A hinge, comprising:
a hinge frame;
a pivot member pivotably engaged with the hinge frame, the pivot member being attached to a support component movably attached to a device;
an elongated member attached to the to hinge frame, the elongated member having a ramped surface on at least a first portion of the elongated member;
an engagement member slidably engaged with the elongated member, the engagement member configured to slide along the elongated member during pivoting of the pivot member relative to the hinge frame, the sliding of the engagement member along the ramped surface of the elongated member causing variations in a sliding friction based on an amount of change in surface height over longitudinal distance of the ramped surface and contributing to a torque profile of the hinge; and
one or more linkage members having a first end and second end, the first end rotatably connected with the engagement member and the second end rotatably connected with the pivot member, the one or more linkage members configured to engage the pivot member and the engagement member causing linear movement of the engagement member to slide along the elongated member during pivoting of the pivot member relative to the hinge frame, and wherein the first end of the one or more linkage members is rotatably connected between an interior of a mounting flange of the engagement member and the elongated member.

13. The hinge of claim 12, wherein moving the support component from a closed position relative to the device to a first open position relative to the device causes opening of the hinge such that the engagement member slides along a second portion of the elongated member having a substantially constant sliding friction, wherein moving the support component from the first open position relative to the device to the closed position relative to the device causes closing of the hinge such that the engagement member slides along the second portion of the elongated member.

14. The hinge of claim 12, wherein the elongated member is fixedly attached to the hinge frame and comprises a shaft having an increasing diameter along the first portion of elongated member.

15. The hinge of claim 12, wherein the engagement member comprises a base portion and at least one extending member elastically deformable relative to the base portion in response to movement of the engagement member along the first portion of the elongated member.

16. The hinge of claim 12, wherein the elongated member comprises a shaft having an increasing diameter along the first portion of elongated member, and wherein the engagement member comprises a base portion and at least one extending member extending from the base portion, wherein the at least one extending member includes opposing walls that slidably engage the shaft, wherein the opposing walls are elastically deformable in response to movement of the at least one extending member along the first portion of the shaft.

17. An apparatus, comprising:
a chassis;
a support component movably attached to the chassis, the support component being configured to physically support the component in one or more positions relative to an adjacent surface;
at least one hinge that moveably attaches a portion of the support component to the chassis, each hinge including:
  a hinge frame;
  a pivot member pivotably engaged with the hinge frame, the pivot member being attached to the support component;
  an elongated member attached to the to hinge frame, the elongated member having a ramped surface on at least a portion of the elongated member;
  an engagement member slidably engaged with the elongated member within the hinge frame, the engagement member configured to slide along the elongated member during pivoting of the pivot member relative to the hinge frame, the sliding of the engagement member along the ramped surface of the elongated member causing variations in a sliding friction based on an amount of change in surface height over longitudinal distance of the ramped surface and contributing to a torque profile of the hinge; and
  one or more linkage members having a first end and second end, the first end rotatably connected with the engagement member and the second end rotatably connected with the pivot member, the one or more linkage members configured to engage the pivot member and the engagement member causing linear movement of the engagement member to slide along the elongated member during pivoting of the pivot member relative to the hinge frame, and wherein the first end of the one or more linkage members is rotatably connected between an interior of a mounting flange of the engagement member and the elongated member.

* * * * *